(12) United States Patent
Gao et al.

(10) Patent No.: US 12,488,309 B2
(45) Date of Patent: Dec. 2, 2025

(54) SYSTEMS AND METHODS FOR TRAINING DATA GENERATION FOR OBJECT IDENTIFICATION AND SELF-CHECKOUT ANTI-THEFT

(71) Applicant: Maplebear Inc., San Francisco, CA (US)

(72) Inventors: Lin Gao, New York, NY (US); Yilin Huang, Shanghai (CN); Shiyuan Yang, Jersey City, NJ (US); Ahmed Beshry, New York, NY (US); Michael Sanzari, New York, NY (US); Jungsoo Woo, Jersey City, NY (US); Sarang Zambare, Brooklyn, NY (US); Griffin Kelly, Brooklyn, NY (US)

(73) Assignee: Maplebear Inc., San Francisco, CA (US)

( * ) Notice: Subject to any disclaimer, the term of this patent is extended or adjusted under 35 U.S.C. 154(b) by 1523 days.

(21) Appl. No.: 16/740,133

(22) Filed: Jan. 10, 2020

(65) Prior Publication Data

US 2020/0151692 A1 May 14, 2020

Related U.S. Application Data

(63) Continuation-in-part of application No. 15/956,159, filed on Apr. 18, 2018, now abandoned.

(51) Int. Cl.
*G06Q 10/087* (2023.01)
*G06F 18/214* (2023.01)
(Continued)

(52) U.S. Cl.
CPC ......... *G06Q 10/087* (2013.01); *G06F 18/214* (2023.01); *G06N 3/08* (2013.01);
(Continued)

(58) Field of Classification Search
CPC .. G06Q 10/087; G06Q 20/203; G06Q 20/208; G06Q 20/201; G06N 3/08;
(Continued)

(56) References Cited

U.S. PATENT DOCUMENTS

| 9,064,161 | B1 | 6/2015 | Boman et al. |
| 10,192,087 | B2 | 1/2019 | Davis et al. |

(Continued)

OTHER PUBLICATIONS https://openaccess.thecvf.com/content_cvpr_2015/html/Liang_Recurrent_Convolutional_Neural_2015_CVPR_paper.html (Year: 2015).*

(Continued)

*Primary Examiner* — Ariel J Yu
*Assistant Examiner* — Denisse Y Ortiz Roman
(74) *Attorney, Agent, or Firm* — Fenwick & West LLP

(57) ABSTRACT

Disclosed are technologies for generating training data for identification neural networks. Series of images are captured of a plurality of merchandise items from different angles and with different background assortments of other merchandise items. A labeled training dataset is generated for the plurality of merchandise items. The series of captured images is normalized, where the merchandise occupies a threshold percentage of pixels in the normalized image. The training dataset is extended by applying augmentation operations to the normalized images to generate a plurality of augmented images. Each image is stored in the training dataset as a unique training data point for the given merchandise item it depicts. Labels are generated mapping each training data point to attributes associated with the depicted merchandise item. Input neural networks are trained on the labeled training dataset to perform real-time identification of selected merchandise items placed into a self-checkout apparatus by a user.

20 Claims, 9 Drawing Sheets

(51) Int. Cl.
*G06N 3/08* (2023.01)
*G06Q 20/20* (2012.01)
*G06V 10/44* (2022.01)
*G06V 10/772* (2022.01)
*G06V 10/82* (2022.01)
*G06V 20/20* (2022.01)

(52) U.S. Cl.
CPC ......... *G06Q 20/201* (2013.01); *G06Q 20/203* (2013.01); *G06Q 20/208* (2013.01); *G06V 10/454* (2022.01); *G06V 10/772* (2022.01); *G06V 10/82* (2022.01); *G06V 20/20* (2022.01)

(58) Field of Classification Search
CPC ...... G06V 20/20; G06V 10/772; G06V 10/82; G06V 10/454; G06F 18/214
See application file for complete search history.

(56) References Cited

U.S. PATENT DOCUMENTS

| | | | |
|---|---|---|---|
| 2014/0015683 A1 | 1/2014 | Subramanya et al. | |
| 2014/0052555 A1 | 2/2014 | MacIntosh | |
| 2015/0127496 A1 | 5/2015 | Marathe et al. | |
| 2017/0255793 A1* | 9/2017 | Caldwell | G06F 21/31 |
| 2017/0323376 A1 | 11/2017 | Glaser et al. | |
| 2018/0025412 A1 | 1/2018 | Chaubard et al. | |
| 2018/0218351 A1 | 8/2018 | Chaubard et al. | |
| 2018/0330196 A1 | 11/2018 | Chaubard et al. | |
| 2019/0043003 A1* | 2/2019 | Fisher | G06T 7/194 |
| 2019/0057435 A1* | 2/2019 | Chomley | G06Q 30/0635 |
| 2019/0102654 A1 | 4/2019 | Trehan | |
| 2019/0220692 A1 | 7/2019 | Wu | |
| 2019/0236363 A1* | 8/2019 | Bacelis | G06K 9/6263 |
| 2019/0279017 A1* | 9/2019 | Graham | G06N 20/00 |
| 2019/0279185 A1 | 9/2019 | Cheng | |
| 2020/0089997 A1* | 3/2020 | Chaubard | G06F 18/214 |
| 2020/0210768 A1* | 7/2020 | Turkelson | G06V 40/50 |

OTHER PUBLICATIONS https://www.ncbi.nlm.nih.gov/pmc/articles/PMC6631981/ (Year: 2019).*
Advancing Retail, 2015, pp. 1-4, [Online] Retrieved from the Internet <URL: https://app.advancingretail.org/solutions/automated-shopping-cart>.
PCT International Search Report and Written Opinion, PCT Application No. PCT/US2021/012905, Apr. 28, 2021, 11 pages.
United States Office Action, U.S. Appl. No. 15/956,159, Jun. 22, 2020, 23 pages.
United States Office Action, U.S. Appl. No. 15/956,159, Feb. 7, 2020, 21 pages.
Canadian Intellectual Property Office, Canadian Office Action, CA Patent Application No. 3,040,252, Nov. 28, 2023, five pages.
European Patent Office, European Examination Report, EP Application No. 21703127.7 Aug. 12, 2024, eight pages.
United States Patent Office, United States Office Action, U.S. Appl. No. 18/403,352, filed Mar. 26, 2025, 17 pages.
Kim, C.Y. et al., "Personalize the Brick'n Mortar", The Korea Society of Management Information Systems, Jun. 13, 2008, pp. 1088-1095.
Singhi, V. et al., "Smart Shopping System for Billing Automation", International Journal of Advances in Engineering Research (IJAER) 2017, vol. No. 13, Issue No. VI, Jun. 2017, pp. 20-33.
Jyotismita, C., et al., "A Beginner's Guide to Image Preprocessing Techniques", Dec. 31, 2019, pp. 90-94.

* cited by examiner

SYSTEMS AND METHODS FOR TRAINING DATA GENERATION FOR OBJECT IDENTIFICATION AND SELF-CHECKOUT ANTI-THEFT

CROSS-REFERENCE TO RELATED APPLICATIONS

This application claims the benefit of priority to U.S. patent application Ser. No. 15/956,159 filed Apr. 18, 2018 and entitled "SELF-CHECKOUT ANTI-THEFT VEHICLE SYSTEMS AND METHODS," the disclosure of which is herein incorporated by reference in its entirety.

TECHNICAL FIELD

The present disclosure relates generally to self-checkout anti-theft systems and methods, and more specifically to a system and method for training one or more neural networks for real-time merchandise tracking.

BACKGROUND

While the problem of object tracking can appear deceptively simple on its surface, it in reality poses a complex challenge involving a plethora of different variables and environmental factors that must be accounted for. Conventional tracking systems are almost always limited to tracking only certain types of targets or targets with suitable characteristics, e.g. targets of a certain size, targets of a certain material composition, or targets having some other property to which the tracking system is attuned. Many recent efforts have focused on implementing computer or machine vision-based systems to computationally locate and track objects, with a goal of achieving a more robust range of targets and environments for which tracking can be performed.

Currently, an increasing number of convenience stores, grocery markets and retail outlets utilize self-checkout kiosks to allow customers to self-service their checkout. The benefit of self-checkout is apparent: grocers are able to save cashier labor while helping to reduce customer wait time by opening additional cash wrap. Despite its benefits, shoppers often encounter technical difficulties, require staff assistance and still line up at self-checkout registers at busy times.

In order to provide a better shopping environment for customers in physical stores, a seamless self-checkout format is needed. Since customers conventionally use a shopping cart or a shopping basket during their store visit, it is more desirable if customers can directly purchase and bag their purchased goods in their shopping vehicles and directly walk out of the store thereafter. In the meantime, necessary anti-theft measures need to be implemented in such self-checkout vehicles to ensure the interests of the grocers are protected.

SUMMARY OF THE INVENTION

The self-checkout anti-theft systems and methods disclosed herein provide a holistic checkout experience that also prevents theft. In one aspect, the disclosed system contemplates, among other features, a centralized computing device that communicates with all the sensors and mechanical structures in the self-checkout vehicle and acts as the command center. The centralized computing device may be connected to an in-store and/or external network through wireless connection devices, including but not limited to Wi-Fi, Bluetooth, Zigbee and the like. The external network connection may allow the centralized computing device to, including but not limited to: 1) send or receive timely information updates relating to inventory, coupon, promotions, stock availability and the like; 2) verify payment status of merchandise in the cart; 3) payment processing; 4) identify item information based on image processing; and 5) send or receive customer information and receipts. The centralized computing device may also communicate with internal sensors or mechanical devices through wired connections or wireless connection devices via an internal network such as Wi-Fi, Bluetooth, Zigbee and the like. The internal network connection may allow the centralized computing device to, including but not limited to: 1) send or receive data from sensors for further processing; 2) communicate between the sensors to triangulate merchandise information; 3) update status of vehicle components; and 4) send or receive mechanical commands to trigger a specific action in the self-checkout vehicle.

According to an aspect of the invention, a method of generating training data for a real-time merchandise identification neural network comprises: obtaining, for each given merchandise item of a plurality of merchandise items, a series of captured images depicting the given merchandise item from multiple angles and in front of multiple different backgrounds, wherein the different backgrounds comprise assortments of other ones of the plurality of merchandise items; generating a labeled training dataset for the plurality of merchandise items, the generating comprising, for each series of captured images depicting a given merchandise item: normalizing the series of captured images to thereby generate a set of normalized merchandise images, wherein the given merchandise item occupies at least a threshold percentage of pixels in each normalized image; extending the training dataset with a plurality of augmented merchandise images, wherein the augmented merchandise images are generated by applying one or more augmentation operations to each normalized merchandise image; populating the training dataset with a plurality of training data points for the given merchandise item, wherein each one of the normalized merchandise images and augmented merchandise images is represented by at least one training data point; and labeling the training dataset by generating one or more labels for each training data point, the one or more labels mapping the training data point to attributes associated with the given merchandise item depicted in the training data point; and training one or more input neural networks on the labeled training dataset, such that a resulting trained neural network can perform real-time identification of selected merchandise items of the plurality of merchandise items placed into a self-checkout apparatus by a user.

In a further aspect, the plurality of merchandise items belongs to an inventory of merchandise items each uniquely associated with a merchandise ID; the attributes mapped by the one or more labels include the merchandise ID uniquely associated with the given merchandise item; and real-time identification of selected merchandise items comprises: capturing identification images of the selected merchandise items as they are placed into the self-checkout apparatus by the user; and providing the identification images of the selected merchandise item to the trained neural network, wherein an output of the trained neural network is used to generate one or more final identification results for identifying the selected merchandise item.

In a further aspect, the trained neural network is an object classification neural network; and the labeled training dataset is a labeled object classification training dataset containing training data points for each merchandise item belonging to the inventory of merchandise items.

In a further aspect, performing inventory registration comprises training the one or more input neural networks on the labeled object classification training dataset such that each merchandise item of the inventory is represented as a unique classification within the trained object classification neural network; and associating the unique classifications for each merchandise item of the inventory with the corresponding merchandise ID for each merchandise item.

In a further aspect, the trained object classification neural network outputs one or more probable classifications for the input identification images of the selected merchandise item; the one or more probable classifications are filtered based at least in part on collection information associated with the capture of the identification images of the selected merchandise item; and the final identification results are generated at least in part by mapping the remaining probable classifications to their corresponding merchandise ID.

In a further aspect, performing inventory updating comprises generating new labeled training data for each new merchandise item added to the inventory; updating the labeled training dataset to include the new labeled training data for each new merchandise item; and training the one or more input neural networks on the updated labeled training dataset to generate an updated trained object classification neural network.

In a further aspect, the trained neural network is a feature extraction neural network; and the labeled training dataset is a labeled feature extraction training dataset containing training data points for only a sub-set of the merchandise items belonging to the inventory of merchandise items.

In a further aspect, performing inventory registration comprises training the one or more input neural networks on the labeled feature extraction training dataset, such that the trained feature extraction neural network generates a unique embedding that corresponds to the features of an input object; using the trained feature extraction neural network, generating a unique embedding for each merchandise item of the inventory, independent of whether or not a merchandise item was contained in the labeled feature extraction dataset; for each merchandise item of the inventory, associating the unique embedding for the merchandise item with the corresponding merchandise ID of the merchandise item; and storing the (unique embedding, merchandise ID) pairs in an inventory registration database.

In a further aspect, the trained feature extraction neural network outputs one or more embeddings for the input identification images of the selected merchandise item, the final identification results are generated by analyzing the output embeddings against at least a portion of the (unique embedding, merchandise ID) pairs stored in the inventory registration database, and the portion of (unique embedding, merchandise ID) pairs is determined by filtering the inventory registration database based at least in part on collection information associated with the capture of the identification images of the selected merchandise item.

In a further aspect, inventory updating is performed by obtaining a new set of captured images of each new merchandise item added to the inventory; generating, using the new set of captured images as input to the trained feature extraction neural network, a unique embedding for each new merchandise item; and storing, in the inventory registration database, a new (unique embedding, merchandise ID) pair for each of the new merchandise items added to the inventory.

In a further aspect, at least a portion of the labeled training dataset is automatically generated for a user-selected merchandise item, where the generating is triggered in response to one or more of: a determination that the user-selected merchandise item has been placed in a self-checkout apparatus; or an indication that a barcode, Universal Product Code (UPC), or merchandise ID for the user-selected merchandise item has been determined at the self-checkout apparatus.

In a further aspect, the merchandise ID includes one or more of a barcode, a Universal Product Code (UPC), or a Price Look Up (PLU) code.

In a further aspect, the method further comprises evaluating a performance of the trained neural network in real-time identification of the selected merchandise items placed into the self-checkout apparatus by the user; and in response to determining that the trained neural network fails to achieve a minimum threshold performance in identifying certain merchandise items, obtaining a plurality of supplemental captured images depicting the certain merchandise items.

In a further aspect, the method further comprises generating, based at least in part on the supplemental captured images, supplemental labeled training data of the certain merchandise items for which the trained neural network failed to achieve the minimum threshold performance in identifying; updating the labeled training dataset with the supplemental labeled training data; and re-training the one or more input neural networks on the updated labeled training dataset.

In a further aspect, obtaining the series of captured images depicting the given merchandise item from multiple angles comprises using at least one camera for each of the multiple angles, each camera having a point-of-view (POV) associated with one of the multiple angles; and training one or more input neural networks on the labeled training dataset comprises: training a neural network for each given camera of the multiple cameras, wherein the training utilizes only the normalized merchandise images and augmented merchandise images derived from the series of captured images that were obtained from the given camera.

In a further aspect, normalizing the series of captured images comprises cropping each captured image such that the given merchandise item occupies a substantially constant proportion of the frame of each normalized merchandise image.

In a further aspect, the method further comprises cropping to a predicted bounding box representing a probable location of the given merchandise item in the frame of the captured image, wherein the predicted bounding box is generated by a computer vision object tracking system that tracks the given merchandise item as it is maneuvered into place for obtaining the series of captured images.

In a further aspect, the augmentation operations include modifying one or more properties of the captured image, the properties including: brightness, contrast, a hue for each RGB channel, rotation, blur, sharpness, saturation, size, and padding; or performing one or more operations on the captured image, the operations including: histogram equalization, embossing, flipping, adding random noise, adding random dropout, edge detection, piecewise affine, pooling, and channel shuffle.

In a further aspect, one or more augmentation operations are applied to each normalized merchandise image, wherein a level or magnitude of the augmentation operation is determined randomly.

In a further aspect, the attributes mapped by the one or more labels generated for the training data associated with each given merchandise item include: an identifier of an angle, POV, or camera from which the training data was derived; or one or more of: a merchandise item weight, color, primary color, color percentages, geometrical relationships, dimensions, dimension ratios, shape, or volume.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
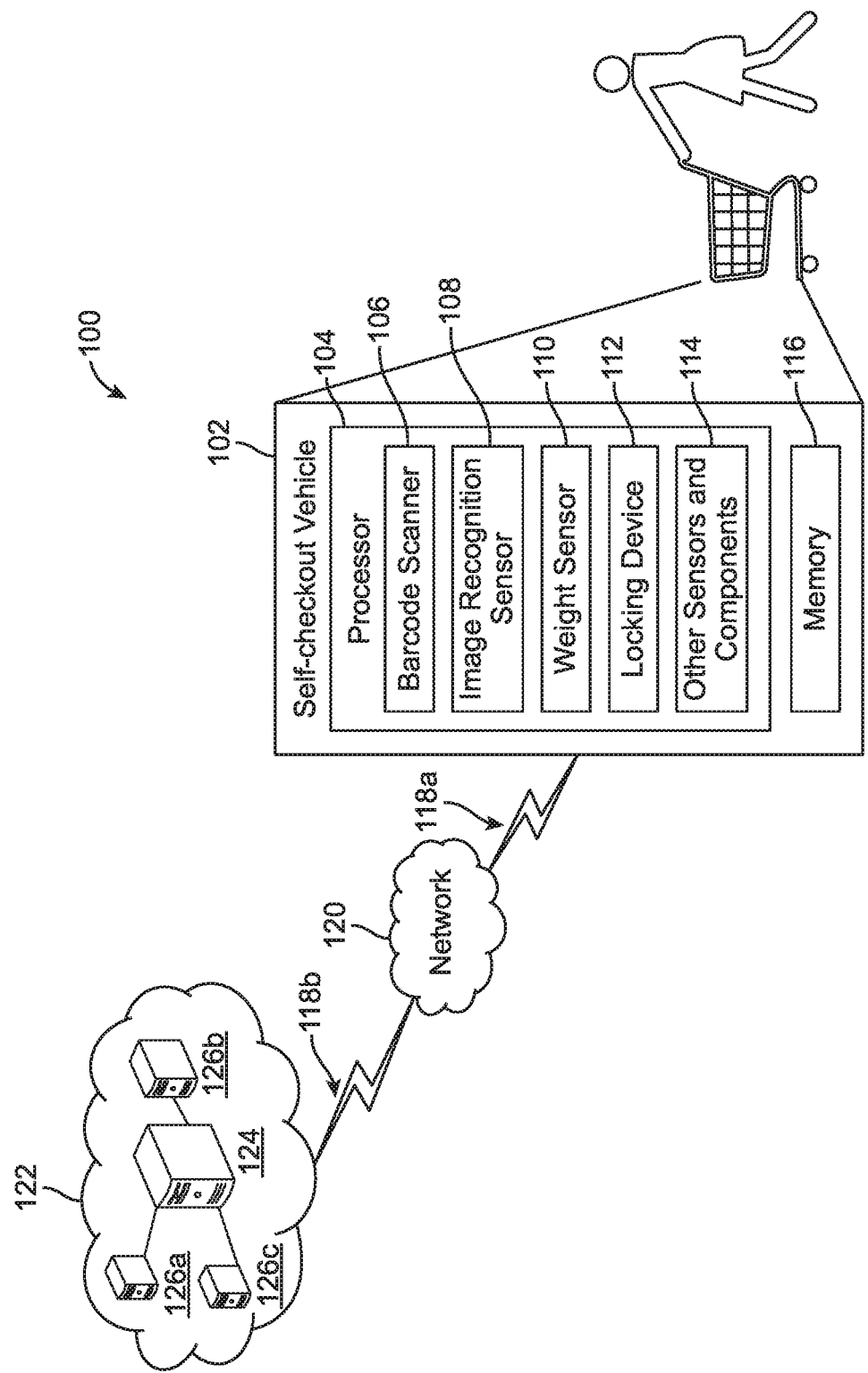
FIG. 1 depicts an example self-checkout anti-theft system according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Using various machine learning techniques and frameworks, it is possible to analyze data sets to extract patterns and correlations that may otherwise have not been apparent when subject to human analysis alone. Using carefully tailored training data inputs, a machine learning system can be manipulated to learn a desired operation, function, or pattern. The performance of a machine learning system largely depends on both the quality and the quantity of these carefully tailored data inputs, also known as training data. Machine learning is capable of analyzing tremendously large data sets at a scale that continues to increase; however, the ability to build and otherwise curate appropriately large training data sets has lagged and continues to be a major bottleneck in implementing flexible or real-time machine learning systems.

This problem of generating appropriate training data is particularly apparent when performing deep learning or otherwise seeking to train machine learning systems to classify or otherwise identify specific objects that may share many characteristics or visual similarities. For example, training a neural network to differentiate between a cereal box and an airplane does not pose the same challenges and difficulties as training a neural network to differentiate between different brands of cereal boxes. Consequently, conventional machine-learning based systems and techniques have yet to be widely applied in performing object recognition, identification, or classification in environments such as retail or grocery—both environments in which it is difficult to build suitable training datasets. This difficulty arises in part due to the many visually similar merchandise items found in retail and grocery stores and is compounded by frequent inventory turnover in which products are added, removed, or have their packaging changed. Accordingly, it is a goal of the present disclosure to provide a training data generation system that can be rapidly deployed and trained to identify and/or classify an inventory of merchandise items as the merchandise items are placed into a self-checkout vehicle operated by a shopper. Moreover, it is a goal of the present disclosure to provide a training data generation system that is flexible to changes made in the mix of merchandise items in an inventory as well as flexible to visual changes made to merchandise items themselves.

Disclosed herein are systems and methods for generating training data for one or more neural networks (NNs) for performing real-time merchandise identification as a shopper adds merchandise items to a self-checkout vehicle. The one or more neural networks disclosed herein can be provided as recurrent networks, non-recurrent networks, or some combination of the two, as will be described in greater depth below. For example, recurrent models can include, but are not limited to, recurrent neural networks (RNNs), gated recurrent units (GRUs), and long short-term memory (LSTMs). Additionally, the one or more neural networks disclosed herein can be configured as fully-connected network networks, convolutional neural networks (CNNs), or some combination of the two.

Before turning to a discussion of the systems and methods for training data generation that are the focus of this disclosure, it is helpful to provide an overview of the context in which these systems and methods may operate. As such, the disclosure turns first to FIG. 1, which depicts a self-checkout anti-theft system 100 in which various aspects of the presently disclosed training data generation systems and methods, along with the resultant trained merchandise identification neural networks, may operate. As illustrated, system 100 comprises a self-checkout vehicle 102 that may be used by a shopper in a retail environment, such as a department store or supermarket, for storing and identifying at least one selected merchandise item, and subsequently facilitating a transaction of the selected merchandise item(s) without requiring the shopper to go to a traditional check-out counter, station, or location for payment. The process of identifying the at least one selected merchandise item placed in self-checkout vehicle 102 by the shopper can be performed using one or more of the trained merchandise identification neural networks that will be discussed below, primarily with respect to FIGS. 4-6. It is noted that the term "vehicle", as used herein, may refer to any portable or movable physical structure supplied by a retailer for use by its customers or shoppers inside the retail environment, such as a wheeled shopping cart in various sizes, a hand-held shopping basket, or a wheelchair/motorized vehicle integrated with a shopping receptacle for use by handicapped or disabled shoppers.

The self-checkout vehicle 102 may comprise at least one hardware processor 104 configured to execute and control a plurality of sensors and components implemented thereon for collecting and processing information related to each merchandise item selected and placed into the self-checkout vehicle 102 by a shopper. As illustrated, the plurality of sensors and components include a barcode scanner 106, an image recognition sensor 108, a weight sensor 110, a locking device 112, and other sensors and components 114. Via various I/O components (not shown), the processor 104 may be coupled to memory 116 which includes computer storage media in the form of volatile and/or nonvolatile memory for executing machine executable instructions stored thereon. The memory 116 may be removable, non-removable, or a combination thereof.

As also shown in FIG. 1, self-checkout vehicle 102 may communicate with a centralized computing device 124 via a first communication network 120 that is configured to, for example: transmit and receive data to and from the plurality of sensors and components of self-checkout vehicle 102 for further processing; communicate between these sensors and components to triangulate merchandise item information; update a status of each sensor and component; and transmit and receive commands to trigger a specific action in self-checkout vehicle 102. The aforementioned plurality of sensors and components provided on self-checkout vehicle 102 can extract necessary merchandise item-based information, such as a location, a weight and/or a partial barcode capture of the merchandise item in order to reduce the search parameters required to perform identification of the merchandise item. As mentioned previously, details of the training data generation underlying the merchandise identification neural networks of the present disclosure (e.g. such as the image recognition neural network 400 of FIG. 4) will be described fully below in relation to FIGS. 4-6.

It is to be appreciated that self-checkout anti-theft system 100 may include any suitable and/or necessary interface components (not shown), which provide various adapters, connectors, channels, communication paths, to facilitate exchanging signals and data between various hardware and software components of self-checkout vehicle 102, centralized computing device 124, and any applications, peer devices, remote or local server systems/service providers, additional database system(s), and/or with one another that are available on or connected via underlying network 120 and associated communication channels and protocols 118a, 118b (e.g., Internet, wireless, LAN, cellular, Wi-Fi, WAN).

Moreover, centralized computing device 124 may be deployed in a second, different communication network 122 to communicate with a plurality of computing devices associated with, for example, a retailer inventory and point of sale (POS) system or any third party database/system/server 126a-c, such that centralized computing device 124 may be configured to: transmit or receive timely information updates relating to a retailer's inventory, inventory mix (i.e. the list of merchandise items that are being offered for sale), coupons, promotions, stock availability and the like; verify payment status of merchandise items contained in the self-checkout vehicle 102; perform payment processing; and identify merchandise item information based on image processing; and send or receive customer information and receipts.

Figure 2A:
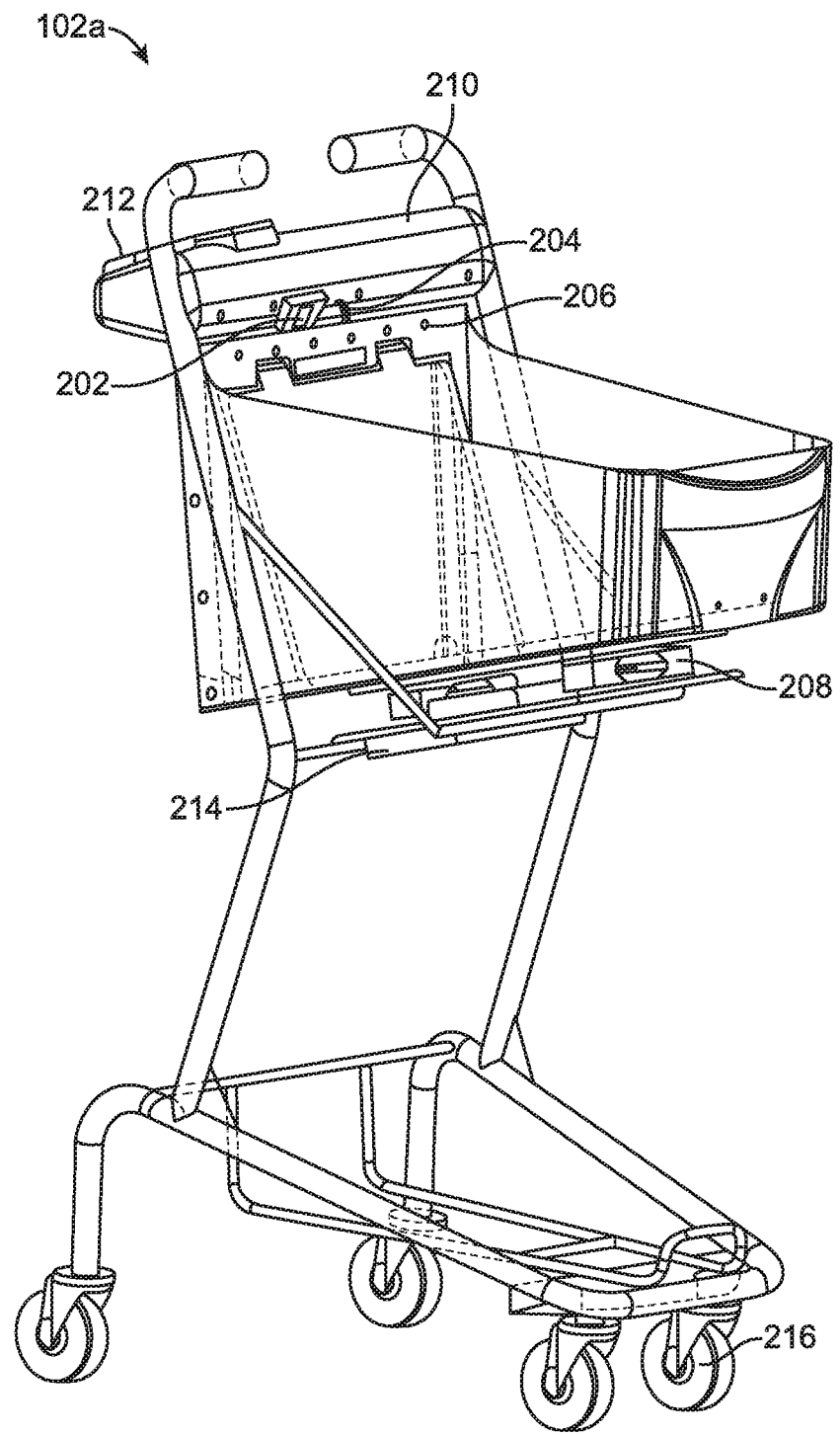
FIG. 2A depicts an example perspective view of a self-checkout vehicle according to one or more aspects of the present disclosure.
Figure 2B:
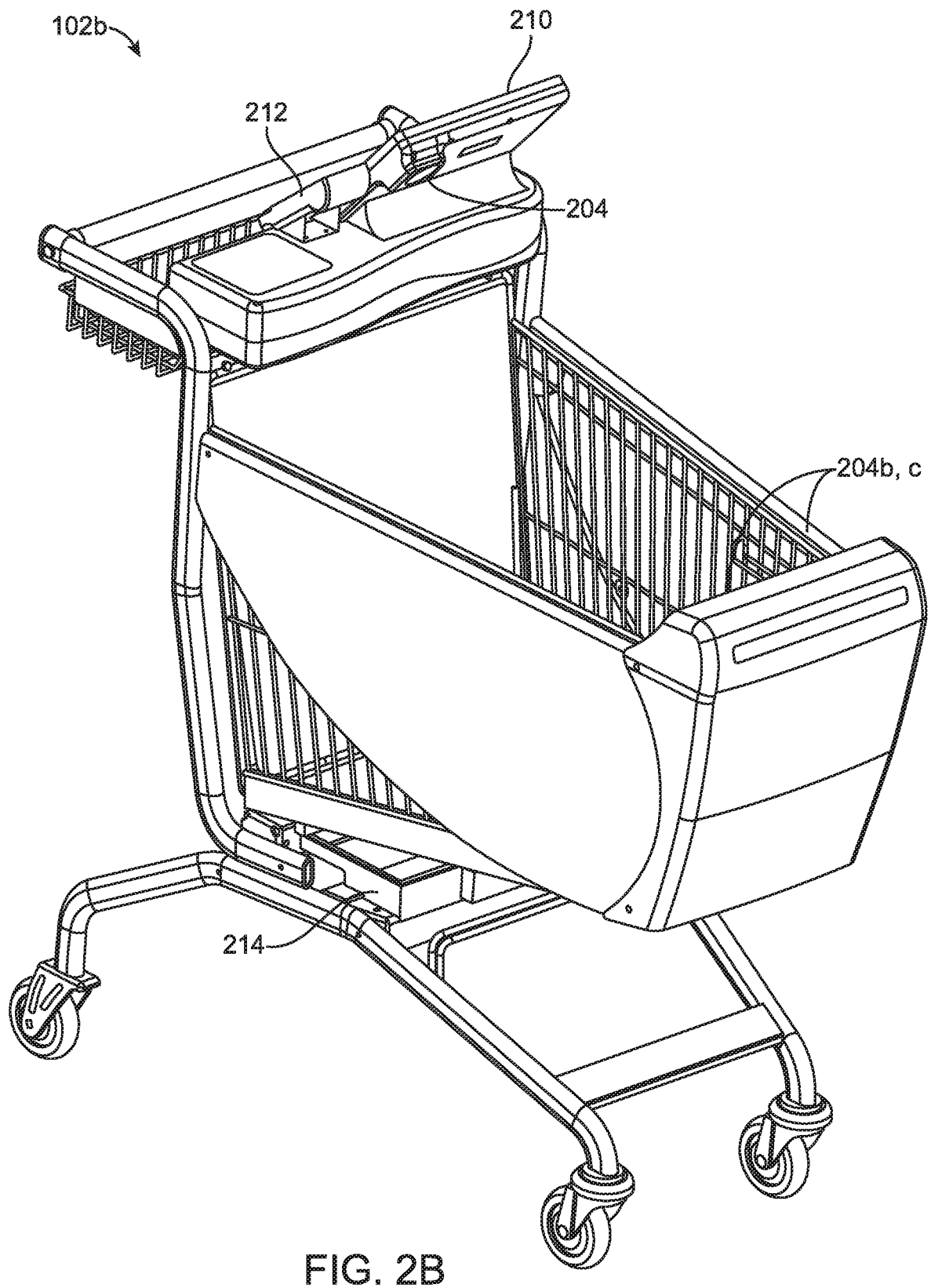
FIG. 2B depicts an example perspective view of a self-checkout vehicle according to one or more aspects of the present disclosure.

The disclosure turns now to FIGS. 2A and 2B, which depict example embodiments of self-checkout vehicle 102. Common reference numerals are used to indicate shared features between the self-checkout vehicle 102a of FIG. 2A and the self-checkout vehicle 102b of FIG. 2B. A barcode scanner 202 can be provided to identify any merchandise item selected and placed into self-checkout vehicle 102 by a shopper. Generally, each merchandise item in a retail store may be associated with at least one unique merchandise ID code. Examples of merchandise ID codes may include, but are not limited to, a bar code, a universal product code (UPC), a quick response (QR) code, a numeric code, an alphanumeric code, or any other two-dimensional (2D) image code or three-dimensional (3D) image code. Barcode scanner 202 may accordingly include any suitable type of circuitry for reading the unique merchandise ID code of a given merchandise item in the retail store. In some embodiments, barcode scanner 202 may be provided as a pen-type scanner, a laser scanner, a charge-coupled device (CCD) scanner, a camera-based scanner, a video camera reader, a large field-of-view reader, an omnidirectional barcode scanner, or some combination of the above. In one aspect, barcode scanner 202 may be disposed or positioned on a selected area of self-checkout vehicle 102, as shown in FIG. 2A. Alternatively, barcode scanner 202 may be implemented as a stand-alone cordless and/or wireless electronic device that may be detachably mounted on a specific area of self-checkout vehicle 102 during use. In some embodiments, barcode scanner 202 may be body mounted on the shopper (e.g., via a wrist band) to leave her hands free to handle objects or goods being scanned or dealing with other tasks or for any other reason or need.

According to an aspect of the present disclosure, barcode scanner 202 may be configured to collect information relating to the selected merchandise item based on the merchandise ID code which may include a machine-readable code in the form of numbers and a pattern of parallel lines of varying widths, printed on and identifying a specific merchandise item. For example, a linear or 1-dimensional (1D) barcode may include two parts: a barcode and a 12-digit UPC number. The first six numbers of the barcode may be a manufacturer's identification number. The next five digits may represent the merchandise item's number. The last number may be a check digit which may enable barcode scanner 202 to determine if the barcode has been scanned correctly. A linear barcode typically holds any type of text information up to 85 characters. In contrast, a 2D barcode is more complex (can store over 7,000 characters) and may include more information in the code such as price, quantity, web address, expiration dates, or an image. Furthermore, engraved or applied to merchandise item itself as a part of the manufacturing process, a 3D barcode may include bars and/or squares that are protrusive and can be felt when touched. The time it takes a laser of a suitably equipped barcode scanner 202 to be reflected back and be recorded may determine the height of each bar/square as a function of distance and time, such that information encoded by the 3D code may be interpreted. 3D barcodes may be a solution for rectifying various problems, such as inaccurate pricing, inventory errors, and overstocking, as it is difficult, if not entirely impossible, to alter or obstruct the 3D barcode's information.

When using a 2D barcode, barcode scanner 202 may read the symbols of the merchandise ID code and convert or decode them into information such as the merchandise item's origin, price, type, location, expiration date, etc. In one aspect, processing circuitry in or associated with barcode scanner 202 may be configured to provide a raw signal proportional to signal intensities detected while scanning the merchandise ID code with limited or no decoding performed within the scanner 202. Rather, the raw signal may be transmitted to the centralized computing device 124 via the first communication network 120 for identifying the merchandise item, thereby achieving a more compact design and implementation of barcode scanner 202. Accordingly, centralized computing device 124 may be configured to process the obtained information regarding the merchandise item received from barcode scanner 202 based at least on the merchandise ID code, correlate such information with at least data stored in various database/system/server 126*a-c* in order to, e.g., identify the merchandise item, update a retailer's inventory and stock availability information associated with database/system/server 126*a-c*, determine appropriate coupons and promotions for distributing to the shopper, and/or facilitate payment processing if the merchandise item is checked out by the shopper.

Self-checkout vehicle 102 may also include at least one light curtain or infrared/laser sensor 206 for detecting and/or distinguishing between a shopper's hand and an object (i.e. merchandise item). In response to such a detection, self-checkout vehicle 102 can trigger at least one camera 204 or 302 to start collecting image or video data of a merchandise item that is moving with respect to a selected reference position of vehicle 102 (e.g., the upper rim of the vehicle), thereby indicating an addition of a merchandise item to self-checkout vehicle 102. In some embodiments, at least one miniature radar (not shown) may be installed on self-checkout vehicle 102 in order to determine shape information related to a merchandise item, detect movement(s) of each merchandise item with respect to self-checkout vehicle 102, and transmit the captured information to the centralized computing device 124 via the communication network 120. In one aspect, one or more weight sensors 208 can be installed on the bottom of self-checkout vehicle 102 in order to continuously monitor changes or fluctuations in a weight of the contents of self-checkout vehicle 102 (e.g. the measured weight will go up or down as merchandise items or other objects are added or removed, respectively, from self-checkout vehicle 102). Alternatively, or additionally, a matrix of pressure sensors mounted to a plate may be used to cover a bottom portion of the enclosure of self-checkout vehicle 102. As such, by analyzing signals of pressure sensors and/or load cells disposed on self-checkout vehicle 102, weight information of each added merchandise item may be derived.

As one or more merchandise items are being added to self-checkout vehicle 102 at respective locations inside a retail store, a touch screen 210,304 on the vehicle 102 may be used to provide various information and indications to the shopper, for example by showing a list containing the name, price and quantity of the identified merchandise item. In one aspect, if the centralized computing device 124 has stored thereon information regarding a shopper's past shopping records or habits, information may be transmitted by the centralized computing device 124 to be displayed on touch screen 210,304 to indicate that a previously bought product may be currently on sale, or that there is a specific offer about a product in which the shopper might be interested. Other information such as store layout map, promotions, or various marketing materials may be selected and displayed. Further, if a merchandise item is no longer needed and permanently removed from self-checkout vehicle 102, the shopper may use touch screen 210,304 to delete the merchandise item from the list. As described previously, the centralized computing device 124 is configured to continuously monitor the plurality of sensors and components of self-checkout vehicle 102. Any change detected by the sensors/components with respect to the contents of self-checkout vehicle 102 will be transmitted to the centralized computing device 124, and relevant information stored in the network 122 will be updated by the centralized computing device 124 accordingly.

In one aspect, to spare the efforts of reloading selected merchandise items into one or more shopping bags at the checkout, self-checkout vehicle 102 may have at least one shopping bag attached to a locking device (not shown). Such locking device may be controlled by the centralized computing device 124 to not only keep the attached shopping bag maximally stretched at all times and ensure that the shopping bag does not crumble or fold thereby allowing a maximum viewing angle for the cameras 204 or 302, but also prevent the shopper from removing merchandise items from self-checkout vehicle 102 without payment. The locking device may include a solenoid, electronic switch or any mechanical device which allows a physical lock and unlock action Moreover, the shopper may use the touch screen 210,304 to initiate a final review of all the selected merchandise items in self-checkout vehicle 102, and indicate her preferred payment methods (e.g., credit card, internet payment accounts). The centralized computing device 124 then communicates with appropriate databases 126*a-c* to facilitate the transaction based on the shopper's selected payment method. For example, a credit card reader 212,306 may be installed on the self-checkout vehicle 102, and the touch screen 210,304 may be configured to display shopper authentication information and credit card transaction information. Specifically, when the shopper slides or inserts a credit card through a receiving slot, credit card reader 212,306 may obtain information stored on the card (e.g., account number, account holder's name, expiration date, etc.) and encrypt this information for payment processing at the centralized computing device 124. Upon successful payment, the centralized computing device 124 may prepare a purchase receipt that may be transmitted to the shopper's mobile device(s) or printable at the store. In addition, the shopping bag attached to self-checkout vehicle 102 may be released from the locking device, such that the shopper is allowed to carry the shopping bag within or out of the retail store without triggering other anti-theft sensors. Moreover, the centralized computing device 124 may reset all the sensors and components of self-checkout vehicle 102 after a completed transaction.

A battery 214 may be installed on self-checkout vehicle 102 for powering various circuitry and components. The battery may be located at the base of the vehicle, as shown, but may also be installed at the handle of vehicle 102, or elsewhere on vehicle 102. Alternatively, or additionally, power may be generated by a charging system, for example, a voltage generator which produces power from the motion of self-checkout vehicle 102. The charging system may charge battery 214, which in turn powers other circuitry and components of vehicle 102. Further, one or more speed sensors 216 may be installed on vehicle 102 for detecting any vehicle movement. For example, when vehicle 102 is moving, the data obtained from weight sensor 208 may not be accurate. As such, when speed sensors 216 detect that vehicle 102 is moving, processor 104 of vehicle 102 may temporarily disable part of the vehicle functions, such as forbidding adding in new merchandise items in order to help adjust weight measurement by weight sensor 208. Alternatively, as one or more merchandise items are being added, speed sensors 216 will detect the self-checkout vehicle's movement and inclination and use this detected information to normalize the data collected by weight sensor 208, i.e. by compensating for any movement induced error in the weight sensor data. As self-checkout vehicle 102 is being moved within its environment, speed sensors 216 will detect changes in level and speed and will be used to ensure the proper indication of the product weight is displayed on self-checkout vehicle 102. Moreover, speed sensors 216 will be used to detect changes in customer activity and movement to subsequently determine when to take a weight measurement of merchandise items being added.

In accordance with yet another aspect of the present application, at least one pathway may be implemented in the retail store and configured to control and direct self-checkout vehicle 102 to a check-out location via, e.g., communication network 120. Further, a turnstile may be positioned at the check-out location, and controlled by centralized computing device 124 to verify payment information of the merchandise item as the shopper walks through the turnstile.

Deep Learning and Training Data Generation

The disclosure turns now to systems and methods for generating training data for training a neural network to perform merchandise identification in substantially real-time, i.e. as a shopper places merchandise items into a self-checkout vehicle. In the context of the discussion below, reference is made to an example scenario in which the self-checkout anti-theft system of the present disclosure is to be deployed in a supermarket or other retail location having an inventory of different merchandise items that are available for shoppers to purchase.

Figure 5:
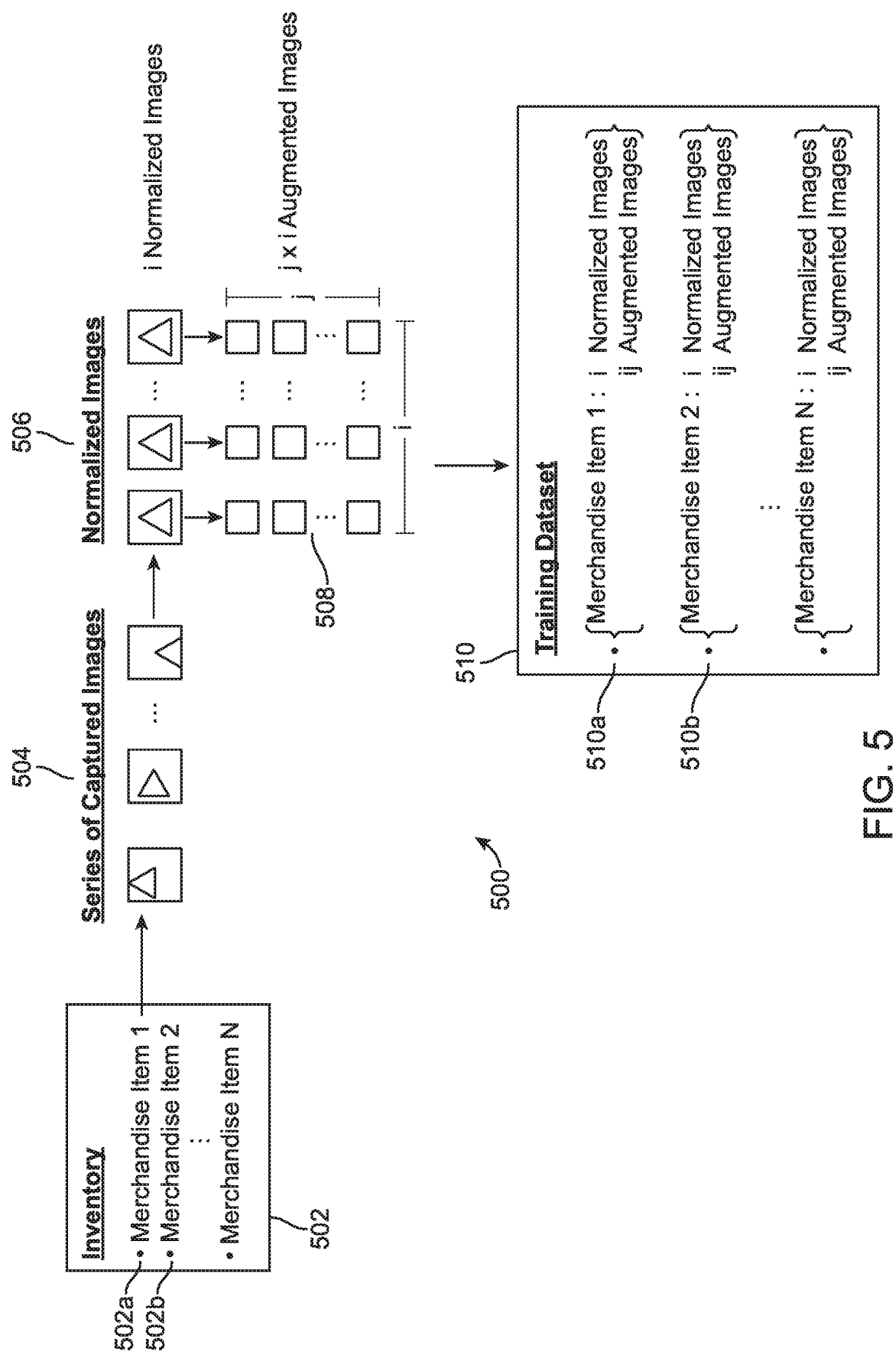
FIG. 5 depicts a schematic diagram of the generation of a training dataset for an inventory consisting of a plurality of different merchandise items, according to one or more aspects of the present disclosure.

FIG. 5 depicts an example diagrammatic process of training data generation for an inventory 502 containing a plurality of merchandise items, labeled here as 'Merchandise Item 1'-'Merchandise Item N'. Each distinct merchandise item in the inventory can be understood as representing a unique barcode, SKU or UPC; in other words, 'Canned Tomatoes, 8 oz., Brand A', 'Canned Tomatoes, 16 oz., Brand A', 'Canned Tomatoes, 8 oz. Brand B', and 'Canned Tomatoes, 16 oz., Brand B' are four separate and distinct merchandise items in the context of the present discussion. This extreme level of granularity required in differentiating various forms of a single product, such as canned tomatoes, separates the challenges solved by the present disclosure versus the coarser object identification and classification performed by conventional machine learning systems.

Image Capture

Broadly, the training data generation process begins with collecting a series of captured images for a given merchandise item. As illustrated in FIG. 5, Merchandise Item 1 is subjected to an image capture process which yields a series of captured images 504. In some embodiments, the series of captured images 504 are captured in close temporal proximity to one another, although it is also possible for the series of captured images 504 to include one or more images that are not temporally proximate in their time of capture.

The series of captured images 504 can be collected using one or more of the cameras 204,302 or image sensors 108 that are disposed on the self-checkout cart 102. For example, a shopper might scan the barcode of a selected merchandise item and then place the selected merchandise item into self-checkout cart 102. As the selected merchandise item is placed into self-checkout cart 102, one or more of the cameras 204,302 can operate to obtain the series of captured images 504. Based on the merchandise identifier (i.e. the barcode) that was just scanned, the series of captured images 504 can ultimately be associated with the merchandise identifier to thereby yield labeled training data.

In some embodiments, the one or more cameras 204,302 operate in response to receiving a triggering signal indicating that a merchandise item is being placed into self-checkout cart 102. In response to the triggering signal, the cameras can be configured to capture a pre-determined number of frames per second over a pre-determined number of seconds. For example, the triggering signal might cause the cameras to capture 10 images/second for 5 seconds, or 2 images/second for 5 seconds, etc. As discussed previously, with respect to the sensors provided on self-checkout vehicle 102, such a triggering signal might be generated based on outputs from one or more of a light curtain, an infrared or laser sensor, a beam break sensor, and/or a computer vision system configured to perform movement detection. By capturing a series of images over the time window in which the merchandise item is being placed into self-checkout vehicle 102, the series of captured images 504 may contain images of the merchandise item in a variety of different perspectives, angles, positions, lighting conditions, etc., which can ultimately assist in creating a more robust training data set.

It is noted that it is also possible for the one or more cameras 204,302 disposed on self-checkout vehicle 102 to capture video data as a merchandise item is placed into the vehicle. A desired number of still images can then be extracted from the various frames of video data. In some embodiments, one or more object tracking algorithms can be applied to track a merchandise item as it is being placed into self-checkout vehicle 102, and then generate a predicted bounding box of the merchandise item's final resting position within the frame. The use of video data and/or object tracking algorithms can help mitigate issues that may otherwise arise when a shopper places a merchandise item in vehicle 102 very slowly and/or manipulates it for a long time, i.e. such that the merchandise item has not come to rest by the time the cameras have finished capturing data over the specified interval (e.g. the 5 second image capture interval in the example above)

In some embodiments, a dedicated process can be used to obtain the series of captured images 504 for various ones of the merchandise items in inventory 502. This dedicated process can be used in lieu of or in combination with the process described above, wherein the series of captured images 504 are obtained over the course of normal shopper interaction with self-checkout vehicle 102. As contemplated herein, the dedicated image capture process can utilize the same or similar self-checkout vehicle 102 to obtain captured images 504, can utilize a standalone image capture system designed to emulate the self-checkout vehicle 102 in obtaining captured images 504, or may utilize some combination of the two.

In some embodiments, the dedicated image capture process is designed to introduce a similar or greater level of randomness or variance in the series of captured images 504, as compared to what would be seen in captured images obtained from shoppers. For example, the dedicated image capture process can require that the given merchandise item be rotated in front of the cameras for a pre-determined period of time and/or a pre-determined number of rotations, so as to better ensure that the training data includes views of the merchandise item from all angles.

Similarly, multiple 'rounds' of image capture might be performed for a single, given merchandise item. In order to better recreate the cart conditions expected when performing merchandise identification in a supermarket or retail environment, the series of captured images 504 can be framed such that the given merchandise item is located against a background consisting of a randomized or varying assortment of other merchandise items (e.g. other merchandise items from inventory 502). In this manner, the series of captured images 504 will include images of the given merchandise item that are taken from a variety of different angles, against a variety of different mixed backgrounds. In one embodiment, the dedicated image capture process can include five, five-second-long 'rounds' of image capture, where the background assortment of other merchandise items from inventory 502 is changed between each round.

Figure 3A:
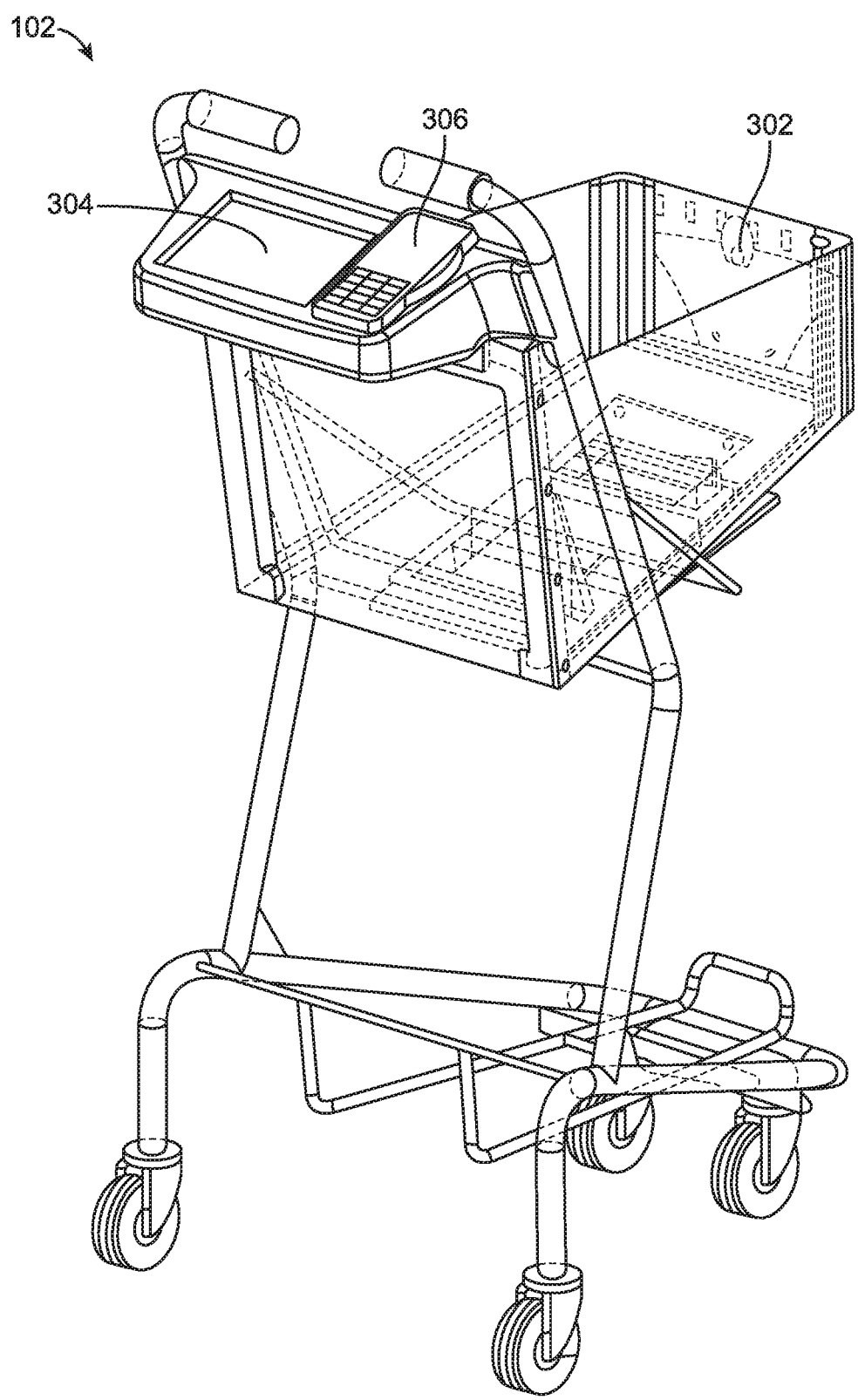
FIG. 3A depicts a second example perspective view of the self-checkout vehicle of FIG. 2A, according to one or more aspects of the present disclosure.
Figure 3B:
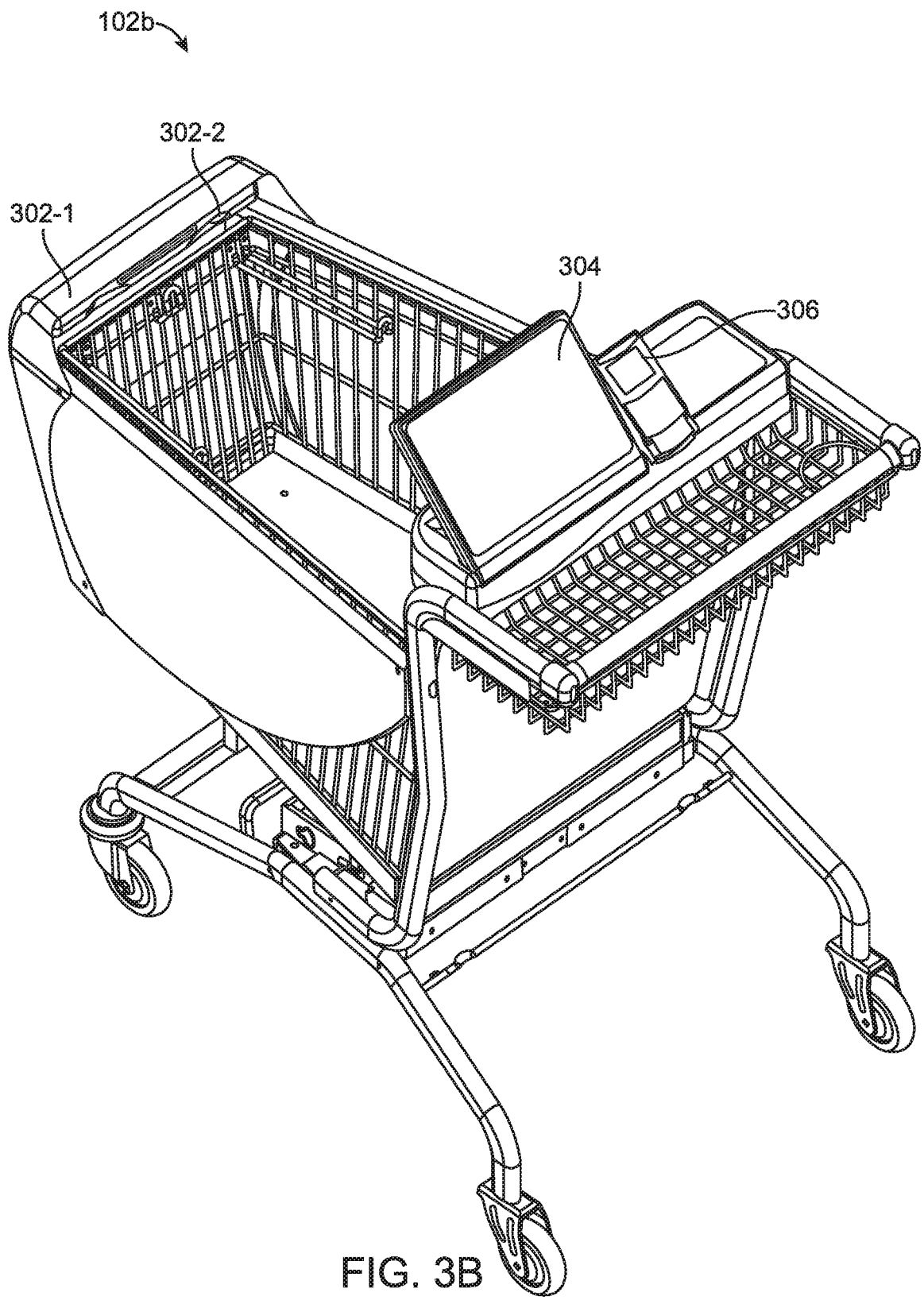
FIG. 3B depicts a second example perspective view of the self-checkout vehicle of FIG. 2B, according to one or more aspects of the present disclosure.

The discussion above generally assumes a scenario in which a single camera point of view (POV) is utilized in capturing images of the merchandise item, or a scenario in which multiple camera POVs are utilized but intermingled into a single series of captured images 504. However, in some embodiments, a different series of captured images 504 is generated for each camera POV. For example, self-checkout vehicle 102b (as seen in FIGS. 2B and 3B) contains an upper camera 204 (seen in FIG. 2B, located near the upper basket area of the cart) and two lower cameras, 302-1 and 302-2 (seen in FIG. 3B, recessed into the cart wall structure at the opposite end of the basket from upper camera 204). With multiple cameras, not only are different angles of the merchandise item captured as it is rotated or otherwise placed into the self-checkout vehicle 102b, but also captured are different camera POVs, which render the merchandise item in fundamentally different ways (e.g. due to lens geometries and other optical differences). Therefore, in some embodiments a separate neural network might be trained for each separate camera POV—meaning that a separate set of labeled training data is needed for each camera POV. Accordingly, the series of captured images 504 might be segregated based on the camera/POV from which it originated. If the captured images from all three cameras are intermingled into a single series of captured images 504, then each captured image can be tagged or otherwise associated with an identifier indicating the camera/POV from which it originated, such that the single series of captured images 504 can be filtered by camera/POV origin for purposes of performing separate neural network training for each camera POV.

Image Normalization

In order to generate training data from the series of captured images, each of the series of captured images 504 are normalized. As depicted in FIG. 5, the normalization process includes cropping the captured image such that the merchandise item occupies an approximately equal percentage of pixels in each normalized image. In some embodiments, the captured images are cropped to a 224×224 pixel square during the normalization process, though of course other crop dimensions and ratios are possible without departing from the scope of the present disclosure.

Normalization can also include rotating the captured images such that merchandise item is oriented in substantially the same fashion or direction in each normalized image. However, in some embodiments, rotation may not be a factor that is normalized or corrected, as it may instead be preferable to include various merchandise rotation angles in the training data set.

As mentioned above, with respect to image capture, one or more computer vision algorithms may be provided in order to perform object tracking, i.e. of a merchandise item as it breaks the plane of the self-checkout vehicle 102 or otherwise is placed into the volume defined by self-checkout vehicle 102. Such a computer vision/object tracking system can utilize one or more of the same cameras 204,302 that are used to obtain the series of captured images 504, and subsequently generate a predicted bounding box indicating a final resting place/position of the merchandise item within the frame. In instances where a predicted bounding box is generated, the normalization process can include cropping each of the series of captured images 504 to their respective predicted bounding boxes.

In some embodiments, normalization can include image pre-processing in the form of histogram equalization, which is applied to the raw output straight from the camera(s) in order to increase the global contrast of the resulting image. Histogram equalization may be applied regardless of whether the captured image is destined for inclusion in a series of captured images 504 and subsequent transformation into a set of normalized images 506, or if the captured image is destined for use as an input to a computer vision/object tracking system for generating a predicted bounding box around the merchandise item within the frame.

As a final note, as illustrated in FIG. 5, the number of normalized images 506 is typically equal to (or slightly lesser than) the number of images in the series of captured images 504. In FIG. 5, this number is depicted as a horizontal dimension i—in other words, the series of captured images 504 and the set of normalized images 506 can both be represented as 1×i data structures. However, it is possible that the number of normalized images 506 is slightly less than the number of captured images 504—this might occur when the normalization process is unable to locate and crop to the position of the merchandise item within the image frame, or when the computer vision/object tracking system is unsuccessful in generating a predicted bounding box for the merchandise item in a given one of the series of captured images 504. However, as will be assumed in the remainder of the discussion of FIG. 5, it is generally the case that the series of captured images 504 and the set of normalized images 506 are equal in number.

Image Augmentation

It would be possible to generate a labeled training dataset using solely the sets of normalized images 506 obtained for various ones of the merchandise items contained within inventory 502. However, the accuracy of the resultant trained neural network would suffer when using only the 5-second-long image capture intervals contemplated in the present example—the volume of captured images 504, and hence the volume of normalized images 506 would simply be too low for sufficient training to take place. Rather than extend the capture interval and capture many more raw images of the merchandise items in inventory 502, the present disclosure instead contemplates the use of image augmentation to increase the size of the training dataset several times over without having to resort to additional raw image capture (beyond that which was required in the steps above).

For a given set of normalized images 506 (corresponding to a single merchandise item from inventory 502), one or more image augmentation operations are applied to each normalized image in order to generate an augmented image.

For example, the image augmentation operations can include, but are not limited to: brightness adjustment, contrast adjustment, adding random noise, independently adjusting hue of RGB channels, random dropout, rotation, blurring, adjusting sharpness, adjusting saturation, embossing, flipping, edge detection, piecewise affine transformation, pooling, scaling, padding, channel shuffling, etc.

By applying different combinations of one or more image augmentation operations to a normalized image, the effect or impact of different lighting conditions can be simulated without having to make physical lighting adjustments during the original process of obtaining the series of captured images 504 (recalling that the captured images 504 come from regular use of self-checkout cart 102 by shoppers and/or a dedicated collection process that makes use of self-checkout cart 102 or a similar hardware apparatus).

In this manner, a single one of the normalized images 506 can be used to produce numerous different augmented images 508 and thereby dramatically increase the size of the ultimate set of training data for the merchandise items. For example, FIG. 5 depicts j different combinations of image augmentation operations being applied to the normalized images 506. Recalling that the set of normalized images 506 can be represented as a 1×i data structure, applying the j different image augmentations yields the j×i set of augmented images 508.

In some embodiments, all of the available augmentation operations might be applied to each one of the normalized images 506. For example, if there are 15 augmentation operations available, then each one of the normalized images 506 will be used to generate 15 new augmented images 508. It is also possible to specify a desired number of augmented images to be generated from each one of the normalized images 506. In this case, if five augmented images are desired per normalized image, then five augmentation operations might be randomly selected from the available 15 augmentation operations. In some embodiments, the augmentation operations might be pseudo-random over the entirety of the series of normalized images 506, such that in the final distribution each augmentation operation is applied approximately the same number of times (or in accordance with some other desired distribution pattern of the augmentation operations).

Additionally, the amount or degree to which any given augmentation operation is applied may also be randomized. For augmentation operations that comprise adjusting a parameter (such as brightness, contrast, or saturation), a first random choice might be made between an up or down adjustment, and then a second random choice might be made as to the magnitude of the adjustment. Some augmentation operations, like brightness, may be subject to pre-determined limits that define a maximum adjustment magnitude, e.g. a range of −15% to +15%.

Generating Labeled Training Data

The combination of the normalized images 506 and augmented images 508 form the overall set of available training data for the merchandise item that the images depict. While the normalized images 506 and augmented images 508 could be labeled manually, e.g. through a process of human review, such an undertaking would be immensely labor intensive and likely cost and time prohibitive. Instead, the present disclosure contemplates that the barcode or other identifying information of the merchandise item that was registered during the initial image capture process can be leveraged to generate labels for the normalized images 506 and/or the augmented images 508.

For example, in the course of operating the self-checkout vehicle 102 to make selections and purchase several merchandise items (as described above with respect to FIGS. 1-3B), a shopper might decide he wishes to purchase a particular merchandise item. In order to do so, the shopper scans a merchandise ID code (i.e. barcode) of the merchandise item and places the merchandise item into self-checkout vehicle 102. As the merchandise item is placed in self-checkout vehicle 102, image recognition sensors 108 (such as cameras 204,302) constantly or periodically capture image and/or video data of the merchandise item. Because the shopper previously used barcode scanner 202 to scan the merchandise ID prior to placing the merchandise item into self-checkout vehicle 102 and in the frame of view of image recognition sensors 108, the centralized computing device 124 may be configured to automatically generate labels that map the captured image(s) to the merchandise ID received from barcode scanner 202. In some embodiments, this label information can be encoded in a file system directory or other organizational hierarchy into which the captured images 504, normalized images 506, and augmented images 508 are stored and organized—then, the training dataset 510 can be labeled based on an examination of the file path(s) for the normalized images 506 and augmented images 508. Note that in embodiments where dedicated image capture is performed, the description above still applies—prior to performing dedicated image capture for a given merchandise item, its barcode can be scanned or its merchandise identifier otherwise logged and associated with the raw files that are output as the series of captured images 504.

In some embodiments, this label information can be encoded into file names of the images themselves. For example, the filenames for the series of captured images 504 might include the full barcode number, a UPC or other identifier extracted from the barcode, or some other unique merchandise item identifier. In this case, the label portion originally inserted into the file names of the captured images 504 is carried forward into the file names of the normalized images 506 and augmented images 508 that are derived from captured images 504. Thus, when the normalized and augmented images 506,508 are incorporated into the training dataset 510, the images are in effect already labeled—the file name simply need be parsed in order to extract the label mapping the given training data image to its corresponding merchandise item.

As shown in FIG. 5, the labeled training dataset 510 includes an entry for various ones of the merchandise items contained in inventory 502, e.g. Merchandise Item 1, Merchandise Item 2, . . . , Merchandise Item N all have an entry in labeled training dataset 510. Each given training data entry depicts the normalized images 506 and the augmented images 508 separately, although it is also possible that training data entries make no distinction between the two. It is also possible for the normalized images 506 and the augmented images 508 to be intermixed but labeled or otherwise associated with an identifier or flag that indicates whether an image is a normalized image or an augmented image.

As mentioned above with respect to Image Capture, in some embodiments a separate neural network might be trained for each separate camera or camera POV that is used to obtain the original series of captured images 504. In such scenarios, a separate set of labeled training data can be generated for each of the separate cameras/POVs. It is also possible for each training data image to be associated with an additional label that indicates the camera/camera POV from which the image originated, such that the overall labeled training dataset 510 can be searched or filtered to obtain only that training data which is appropriate to train a neural network for a desired camera/camera POV.

Neural Network Training

According to yet another aspect of the present disclosure, referring back to FIG. 1, the image recognition sensors 108 may be configured to: capture one or more images of the merchandise item after the merchandise item has been placed inside the self-checkout vehicle 102 (or as the merchandise item is being placed inside the self-checkout vehicle 102), and transmit the series of captured images to the centralized computing device 124 via the first communication network 120, such that centralized computing device 124 can determine whether the identified merchandise item placed into self-checkout vehicle 102 is the same as the merchandise item that the shopper scanned with barcode scanner 106. This comparison avoids or reduces the practice of shoppers scanning a less expensive item and then placing a different, more expensive item into their cart (i.e. self-checkout vehicle 102). Specifically, the centralized computing device 124 may utilize the computation resources of the associated database/system/server 126*a-c* to implement one or more deep learning systems for training various neural network models to perform object detection and recognition and/or to perform merchandise identification, leveraging training data generated at least in part from merchandise item images received from the self-checkout vehicle 102 for object detection and recognition purposes, e.g., as described in the two examples above. As shown in FIGS. 2A-3B, data such as still images and/or video can be obtained from cameras 204 and/or 302 of the self-checkout vehicle 102 and may be used by the centralized computing device 124 and associated database/system/server 126*a-c* to form a distributed neural network.

Ultimately, the training data generated according to the present disclosure is designed to be sufficient for training one or more neural networks to identify each of the merchandise items contained within inventory 502. Discussed below are two neural network implementations for performing merchandise identification in real-time, as a shopper places their selected merchandise items into self-checkout vehicle 102. In a first implementation, the trained neural network performs object (i.e. merchandise) classification, and the training dataset 510 includes every merchandise item in inventory 502. In a second implementation, the trained neural network performs feature extraction, and the training dataset 510 may include only a portion of the merchandise items in inventory 502. Each implementation is discussed in turn below.

Neural Network Training—Object Classification

If the neural network is to perform object (i.e. merchandise) classification, then the requisite training data set spans the entirety of inventory 502 and includes labeled training data images for each merchandise item of the inventory 502.

Labeled training data images for each merchandise item are needed because, during the training process, a class/classification is created for each merchandise item. Accordingly, each merchandise item must be associated with a plurality of labeled training images (i.e. the normalized images 506 and augmented images 508 described previously). In some embodiments, the series of captured images 504 consists of 50-500 images per merchandise item of inventory 502, although other numbers of captured images may be employed without departing from the scope of the present disclosure.

Applying augmentation operations can increase the number of images per merchandise item by 10× or more; the size of the overall training dataset 510 can thus become unwieldy in relatively short order, particularly considering the very large number of unique merchandise items most supermarkets or other retail stores might commonly carry in their inventory 502. Therefore, in some embodiments, a fewer number of augmentation operations might be utilized when generating training dataset 510 for use in training an object classification neural network, in an effort to reduce the training time needed.

In some embodiments, one or more of the neural networks can be pre-trained on one or more broad object classification databases, e.g., such as ImageNet, and then subsequently be trained on the labeled training dataset 510 generated in accordance with the above description. In some examples, it has been observed that approximately five hours are required to train a neural network with a labeled training dataset consisting of 500 merchandise items with 50 training images each, although of course the total training time will vary depending on the hardware configuration or computational power available for use in training. More notably, the total training time has been observed to increase almost linearly with the amount of data or merchandise items that are present in the labeled training dataset 510.

When the inventory mix changes (i.e. when merchandise items are added or removed from inventory 502), a neural network trained on a training dataset generated based on the old inventory mix will not have a classification exactly corresponding to the new merchandise items, and re-training will likely be needed in order to maintain a high level of accuracy in the desired merchandise identification.

In general, merchandise items that have been removed from inventory 502 will have their training data (normalized and augmented images 506,508) removed from the labeled training dataset 510. Each merchandise item that has been added to inventory 502 will need to undergo the same training data generation process described previously, i.e. obtaining a series of captured images 504, generating normalized images 506, generating augmented images 508, and labeling. Additionally, any merchandise item that has been visually modified or otherwise changed (e.g. seasonal packaging, packaging redesign, other product modifications) will need to have its old training data removed from the training dataset 510 and undergo the generation process to obtain training data corresponding to the new appearance of the merchandise item.

After these changes have been made to the labeled training dataset 510, the neural network must be re-trained—e.g. taking as input the neural network pre-trained on ImageNet and performing a full training over all of the classes contained within the updated labeled training dataset. While this process can make use of previously generated training data for all of those merchandise items in inventory 502 that did not undergo any changes, the actual training process itself must effectively start over again, which can introduce unwanted delays that arise while waiting for the full training process to conclude.

Neural Network Training—Feature Extraction

However, if the neural network is to perform feature extraction rather than object classification, then the requisite training dataset can be much smaller in comparison to the object classification training data set—notably, a training dataset for a feature extraction neural network may need only include a portion of the merchandise items contained within inventory 502. In some embodiments, incorporating training data for additional merchandise items beyond this threshold offers limited to marginal returns, as additional training data inputs might complicate or diminish the performance of a neural network that was otherwise achieving a satisfactory accuracy level in performing feature extraction.

In some embodiments, the training dataset 510 might include training data generated for approximately 1,000 of the merchandise items contained in inventory 502—regardless of how many merchandise items in total are contained in inventory 502. Rather than creating a class for each merchandise item or each set of input training data (as in the description above of the object classification neural network training), the feature extraction neural network is instead trained as a general model, which, notably, is not intrinsically tied to the mix of merchandise items contained within training dataset 510. Hence, in contrast to the object classification neural network, the feature extraction neural network is able to be trained on only a portion or subset of the totality of different merchandise items contained in training dataset 510.

Training dataset 510 can include approximately 10-20 normalized (i.e. distinctly captured) images for each of the 1,000 merchandise items. A desired number of augmentation operations can be applied to the normalized images in order to generate a corresponding number of augmented training images for each merchandise item, thereby extending the depth of training dataset 510. In some embodiments, training dataset 510 can include a total of 10-20 images (i.e. normalized plus augmented) for each of the 1,000 merchandise items, which can result in a more lightweight and efficient training operation for the feature extraction neural network.

In some examples, training the feature extraction neural network on the training dataset 510 containing training data for 1,000 of the merchandise items of inventory 502 takes approximately 10 hours. In some embodiments, the feature extraction neural network can be pre-trained on a general training set, i.e. for performing a basic feature extraction that is generic to all of the merchandise items, prior to performing the feature extraction training that leverages the unique merchandise items of inventory 502.

The resulting trained feature extraction neural network can then generate as output a unique embedding or feature map for any given input image of a merchandise item, even if the input merchandise item was not contained in training dataset 510 or the feature extraction neural network was not otherwise exposed to the merchandise item during the training process. From these unique embeddings and/or feature maps, all of the merchandise items contained in inventory 502 can be identified—again, even though the feature extraction neural network was never exposed to a portion of these merchandise items during the training process.

Once the feature extraction neural network has been trained, it is used to generate an embedding for each merchandise item contained in inventory 502. Because the feature extraction neural network has already been trained, these embeddings can be generated in substantially real-time. For each merchandise item, the generated embedding(s) are associated with the unique identifier or merchandise ID of the merchandise item. For example, the generated embeddings and corresponding merchandise ID association can be stored at one or more of the central computing device 124 and databases 126 as seen in the architecture diagram of FIG. 1.

From this overall mapping of {extracted features/embeddings; merchandise ID} pairs, merchandise items can be identified in substantially real-time as they are placed into a cart, e.g. self-checkout vehicle 102, by a user. One or more images of the merchandise item are captured as it is placed into self-checkout vehicle 102, as has been described previously above. Pre-processing can be applied to the captured images, including but not limited to histogram equalization, cropping to a bounding box or close-up view of the merchandise item, etc., as has also been previously described above. The captured images are then provided as input to the trained feature extraction neural network, which generates an embedding for the input merchandise item represented in the captured images.

The generated embedding is then analyzed against the repository of mappings between various embeddings and their corresponding merchandise IDs. From a probabilistic or statistical analysis of the generated embedding and the repository of embedding mappings, the merchandise item from the captured images is identified. This identification can consist of a single merchandise ID, or multiple (e.g. top three most probable) merchandise IDs. Each merchandise ID can also be associated with a confidence level or some other parameter indicating the quality of the prediction.

Once the feature extraction neural network has been trained, it is not necessary to perform an additional training or re-training process of the neural network when the product mix (i.e. unique merchandise items) of inventory 502 changes. Instead, the database 126 storing mappings of {embedding; merchandise ID} pairs is updated using the same feature extraction neural network that was trained previously. For example, merchandise items that are removed from inventory 502 are removed from the database of mappings; new merchandise items that are added to inventory 502 are processed through the trained feature extraction neural network in order to generate a corresponding {embedding; merchandise ID} pair; and existing merchandise items that have been visually modified are processed through the trained feature extraction neural network in order to generate a new embedding to update the existing {embedding; merchandise ID} pair for the existing merchandise item.

In comparison to the previously discussed object classification neural network, which was relatively inflexible to changed composition of inventory 502 and required re-training on the new classes of merchandise items, the trained feature extraction neural network can be used for long periods of time without re-training, simply updating the database of {embedding; merchandise ID} pairs, as described above, in response to a changed composition of inventory 502 or a changed visual appearance of one or more merchandise items within inventory 502. In some embodiments, the feature extraction neural network can be re-trained in response to an observed increase in errors in identification, or an observed decrease in accuracy, over time, e.g., after several months if the trained feature extraction neural network begins exhibiting an accuracy below 95%, then training might be performed again.

In some embodiments, various filtering factors can be used to reduce the search space of the embedding mappings stored at central computing device 124/database(s) 126. For example, an in-store location can be determined for the captured images of the merchandise item to be identified (e.g. 'Aisle 4'; or 'Aisle 5, Shelf 3'; or some other positional coordinate). This in-store location can be obtained in various ways, including but not limited to: beacon devices to triangulate the location of self-checkout vehicle 102; Wi-Fi; labels or markers in the field of view of the camera(s) of self-checkout vehicle 102 that allow a computer vision system to determine an in-store location; and various other localization and position determination techniques as would be appreciated by one of ordinary skill in the art. This raw in-store location information can be cross-referenced with a planogram of the retail environment, which provides a detailed mapping of each merchandise item (i.e. merchandise ID) location within the retail environment, or otherwise provides detailed information of the placement of each merchandise item (i.e. by its merchandise ID) within the retail environment. This planogram can be stored at one or more of central computing device 124 and database 126, and used to cross-reference the raw in-store location information in order to determine the subset of nearby merchandise IDs for which embeddings should be retrieved and analyzed against the generated embedding for the captured image of a merchandise item.

More particularly, in some embodiments, based on the in-store location, the {embedding, merchandise ID} data points for only proximately located merchandise items can be used as the basis against which the embedding generated for the captured images by the feature extraction neural network is analyzed. For example, if the in-store location was Aisle 4, then the generated embedding might be analyzed only against the embeddings of merchandise items located in Aisle 4; if the in-store location was Aisle 5, Shelf 3, then the generated embedding might be analyzed only against the embeddings of merchandise items located in Aisle 5, Shelf 3. It is also possible for a margin of error to be applied to include a pre-determined amount of merchandise items that are not in the identified in-store location, but are of a pre-determined proximity to the identified in-store location (e.g. an in-store location of 'Aisle 5, Shelf 3' might trigger an analysis against the embeddings of merchandise items located in Aisle 5, Shelves 2-5).

In some embodiments, the in-store location can be used to refine the weightings assigned to different merchandise IDs that are predicted for a generated embedding of a merchandise image, rather than to refine the selection of embeddings against which the newly generated embedding for the captured image of a merchandise item is analyzed. In this manner, the generated embedding is analyzed against all of the {embedding; merchandise ID} pairs stored at central computing device 124/database 126, and the filtering effect of the in-store location is applied after the fact in only a predictive manner (e.g. given two merchandise IDs of equal probability, the merchandise ID with a location nearer to the in-store location at which the image was captured will be weighted as more probable for purposes of identification).

In operation, the trained feature extraction neural network can be deployed on one or more servers or computing devices (which can include one or more of central computing device 124 and the computing devices 126) that are local to the retail environment in which the self-checkout anti-theft system of the present disclosure is deployed, can be deployed into one or more cloud environments, or some combination of the two. In some embodiments, the trained feature extraction neural network can be deployed locally to execute on one or more processors or GPUs, e.g., of self-checkout vehicle 102. In some embodiments, a lightweight version of the trained feature extraction neural network can be generated for local deployment on self-checkout vehicle 102, wherein the lightweight version is designed to compensate for any reductions in available computation power onboard self-checkout vehicle 102, such that the feature extraction and subsequent identification of merchandise items placed into the self-checkout vehicle by the user can be performed in substantially real-time.

Figure 6:
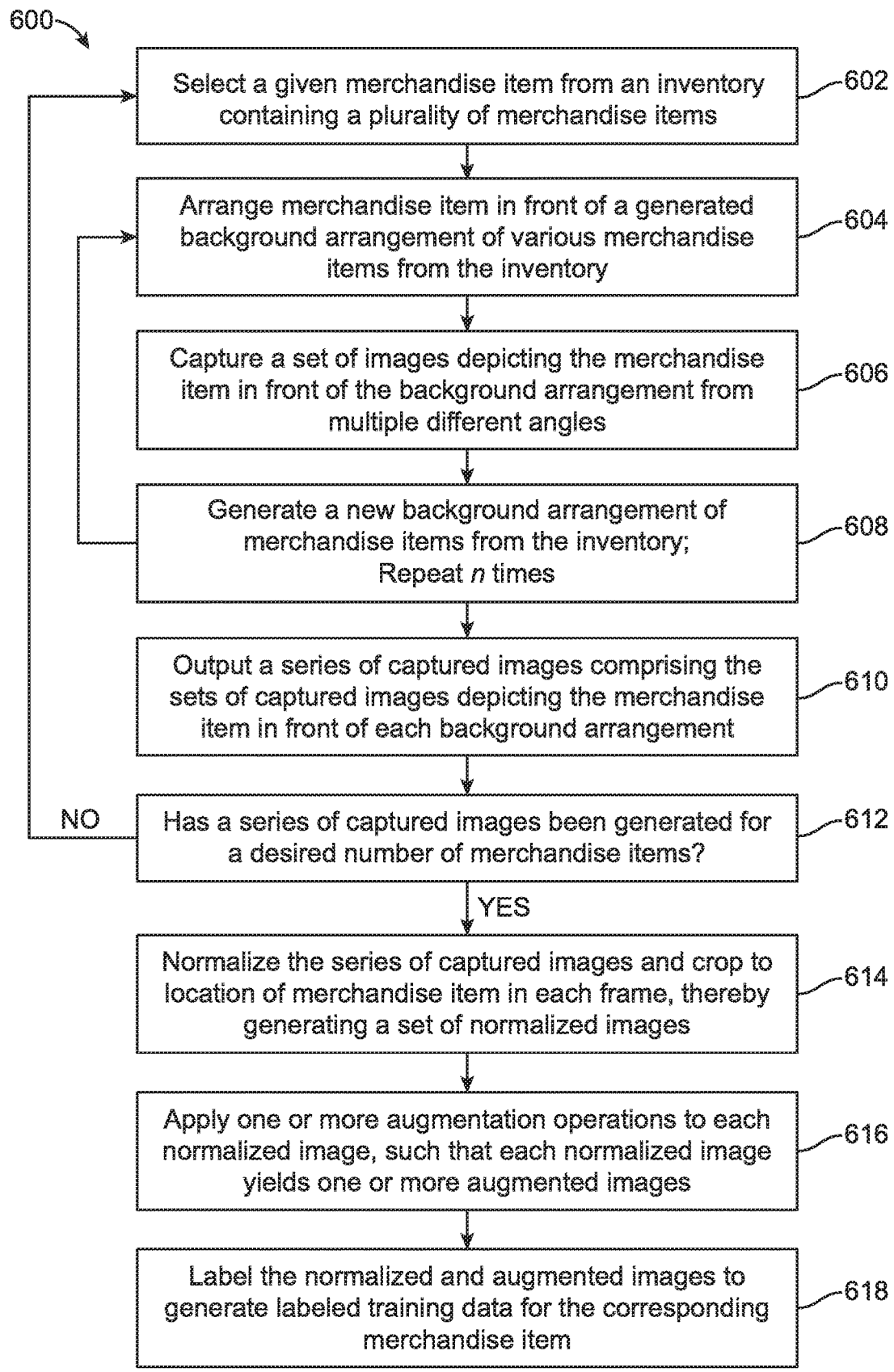
FIG. 6 depicts an example method according to one or more aspects of the present disclosure.

The disclosure turns now to FIG. 6, which depicts an example method 600, for generating neural network training data for a plurality of merchandise items according to aspects of the present disclosure. As illustrated, the method begins with a step 602, in which a given merchandise item is selected from an inventory that contains a plurality of different merchandise items. This inventory may be associated with a retail environment, such as a supermarket or convenience store. In some embodiments the inventory can be organized by the barcode, UPC, or other unique product identifier that is assigned to each different merchandise item offered in the retail environment. Generally, it is contemplated that the method 600 corresponds to the generation of training data for an initial deployment of the presently disclosed self-checkout anti-theft system and method, although it is also possible for method 600 be deployed in order to generate new or updated training data to perform a subsequent training operation on a previously trained neural network and/or to generate new or updated training data to perform a re-training operation in response to one or more changes in the inventory mix. Additionally, it is contemplated that the selection of step 602 be performed from the inventory without replacement, although it is also possible to perform the selection with replacement and cull or otherwise remove duplicates at some subsequent point.

With the given merchandise item selected, the method proceeds to a step 604, in which the selected merchandise item is placed in front of a background arrangement generated to contain a random or semi-random assortment of various other merchandise items from the inventory. As discussed previously, it is possible that the arrangement of the selected merchandise item in front of the background merchandise items may take place in a cart or other volume contained within self-checkout vehicle 102, or that the arrangement of the selected merchandise item in front of the background merchandise items may take place in a dedicated system or apparatus designed to emulate the self-checkout vehicle 102 and the resulting merchandise images that it captures. In some embodiments, the selected merchandise item from step 602 may be selected out of the background arrangement of merchandise items, with a replacement merchandise item being placed into the background arrangement to replace the selected merchandise item and keep the background arrangement of merchandise items approximately constant in its number of constituent items.

In a step 606, a series of images is captured from multiple different angles, each angle (and hence, each captured image) depicting the selected merchandise item and the background arrangement from a different angle and/or different relative positioning. For example, the series of images could be captured as a user places the selected merchandise item into a cart or volume of self-checkout vehicle 102, or the series of images could be captured as a user rotates the selected merchandise item in front of the background arrangement and in the field of view of one or more cameras or other image capture devices. The series of images may be captured as individual still images, can be captured as a series of still frames extracted from a video, or some combination of the two. In some embodiments, one or more depth cameras can be employed to capture one or more images of the series of captured images. In an example, captured images might be obtained over a period of 5-10 seconds, at a rate of 2-10 images per second, although of course other image capture rates/schemes are possible without departing from the scope of the present disclosure.

In a step 608, a new background arrangement of merchandise items is generated. The new background arrangement may consist of substantially the same mix of merchandise items as was contained in one or more prior background arrangements, but repositioned, shuffled, or otherwise randomized so as to comprise a visually distinct or different background arrangement. In some embodiments, the new background arrangement of merchandise items can be selected anew from the inventory of merchandise items.

The method then returns to step 604, wherein the selected merchandise item is placed in front of the newly generated background and a series of images is captured. Step 608 is repeated for some pre-determined number of times, n, until sufficient variation in the background is achieved for the overall captured images of any one given selected merchandise item. In some embodiments, the number n of background arrangement changes is the same for all merchandise items. In some embodiments, the number n of background arrangement changes can depend on the specific merchandise item, or a class of the merchandise item (e.g. more background changes for produce merchandise items than for pre-packaged cereal merchandise items).

After the sets of captured images are obtained of the selected merchandise product in front of a desired or sufficient number of background arrangements, the method proceeds to a step 610, in which a series of captured images—comprising the individual sets of captured images depicting the merchandise item in front of each background item, obtained in step 606—for the selected merchandise item is output. This series of captured images for the merchandise item can contain a number of captured images approximately equal to the number of image captures per set of images (i.e., step 606) multiplied by the number of background changes (i.e. n+1, see step 608). The series of captured images (and the individual sets of images from step 606) can be stored locally at the camera or image capture device, and later uploaded to the cloud or a central computing device 124/database 126. In some embodiments, the series of captured images can be streamed wirelessly to one or more of a cloud environment and/or central computing device 124/database 126.

In a next step 612, the method reaches a decision point. If a series of captured images (i.e. the output of step 610) has been generated for a desired number of different merchandise items, then the method proceeds to step 614. If a series of captured images has not been generated for a desired number of different merchandise items, then the method returns to step 602, where a new merchandise item is selected from the inventory and steps 604-610 are repeated in order to generate the corresponding series of captured images for the newly selected merchandise item.

After a series of captured images has been generated for the desired number of merchandise items (i.e. decision point 612 has a 'YES' answer), then the method proceeds to steps 614-618. Steps 614-618 are performed for each series of captured images out of the plurality of series of captured images obtained for the desired number of merchandise items. It is noted that the following description is made with reference to a single given one of the series of captured images but applies equally to each series of captured images generated in the preceding steps.

In a step 614, the series of captured images is normalized and cropped. For each captured image of a given series of captured images (all depicting a selected merchandise item), normalization includes, but is not limited to, histogram equalization and other pre-processing operations. Each captured image is cropped to the location of the merchandise item within the frame of the captured image, which in some embodiments is configured to be a 224×224 pixel crop, although other cropping methods may be employed without departing from the scope of the present disclosure. In some embodiments, one or more computer vision and/or object detection and tracking systems or algorithms can be employed to track the movement of a merchandise item until it is placed in its final position in the field of view of the cameras or image capture devices. The computer vision and/or object detection and tracking systems can generate a bounding box indicative of the probable location of a merchandise item as placed in the frame of the cameras/image capture devices, and the cropping operation can crop to the coordinates as defined by the bounding box.

In a step 616, the training data set comprising the normalized images of the selected merchandise item is extended by applying one or more augmentation operations to each normalized image. The augmentation process thereby yields at least one, and in many embodiments, multiple augmented images for each normalized image. The training data comprising the combination of the normalized images and augmented images for the selected merchandise item is therefore extended multiple times over in comparison to the training data set (of step 614) comprising only the normalized images. As mentioned previously, the image augmentation operations can include, but are not limited to: brightness adjustment, contrast adjustment, adding random noise, independently adjusting hue of RGB channels (or channels within various color spaces, including but not limited to sRGB, Adobe RGB, ProPhoto, DCI-P3, Rec 709 or various other color spaces as would be appreciated by one of ordinary skill in the art), random dropout, rotation, blurring, adjusting sharpness, adjusting saturation, embossing, flipping, edge detection, piecewise affine transformation, pooling, scaling, padding, channel shuffling, etc. By applying different combinations of one or more image augmentation operations to a normalized image, the effect or impact of different lighting conditions can be simulated without having to make physical lighting adjustments during the original process of obtaining the series of captured images.

In a step 618, the training data comprising the normalized images and the augmented images of the selected merchandise item is labeled, where the labels indicate a mapping or association between the given normalized/augmented image and a barcode or unique merchandise ID of the merchandise item depicted in the given normalized/augmented image. In some embodiments, the label information can further include indications such as a value representing the volume of the depicted merchandise item; a value representing a weight of the item; a value specifying at least one outer dimension of the depicted merchandise item; a value representative of the geometrical shape of the depicted merchandise item; a value representative of geometrical relations of the depicted merchandise item, such as a relation between at least two of width, height and length; a set of at least two values related to colors of the depicted merchandise item; a set of values related to the area which at least one specific color takes up in the depicted merchandise item, including the percentage that areas with a certain color take up with respect to at least one side of the outer surface of the depicted merchandise item; data related to the color taking up the biggest fraction, optionally the second biggest fraction, etc., of at least one side of the outer surface of the depicted merchandise item.

Neural Network Architecture

Figure 4:
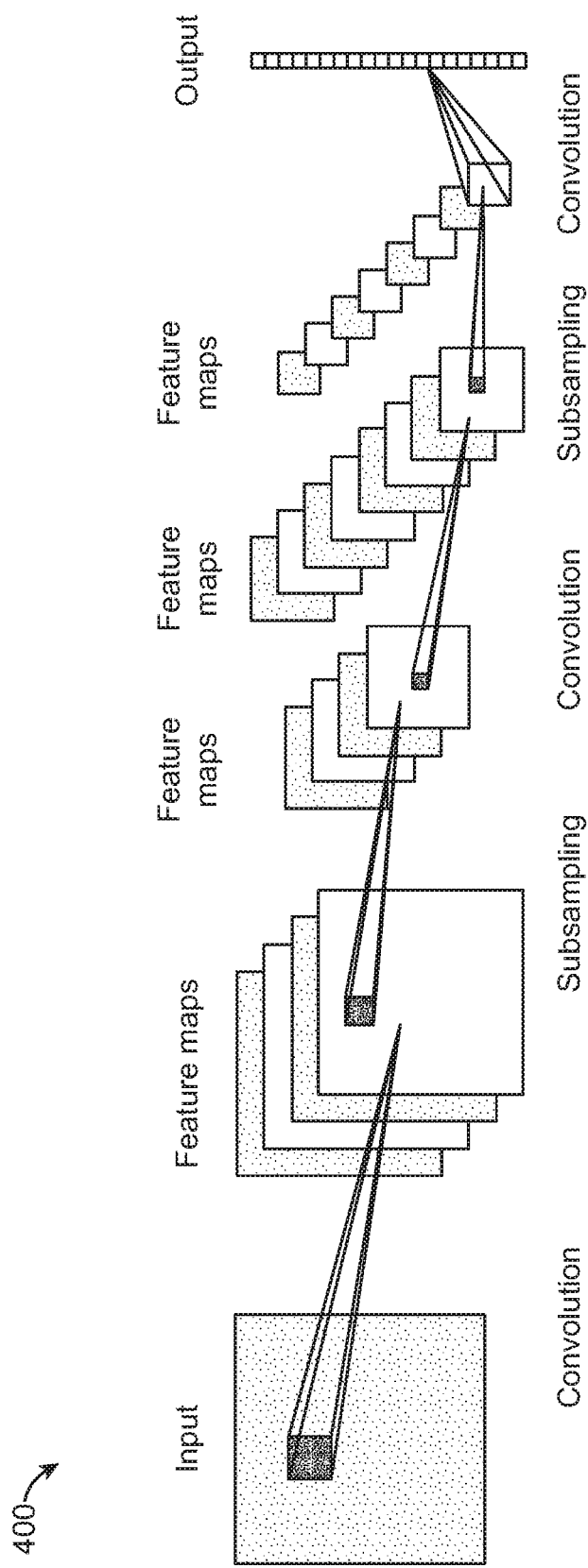
FIG. 4 depicts a deep learning neural network of a self-checkout anti-theft system according to one or more aspects of the present disclosure.

FIG. 4 depicts a high-level architecture diagram of an example distributed neural network 400, which can perform real-time data analysis including segmentation, object/merchandise detection, tracking, recognition, or the like. In some embodiments, the neural network of FIG. 4 and the accompanying description may be used to implement one or more aspects of the object classification neural network and/or the feature extraction neural network described in the two examples above. Returning now to the example distributed neural network 400, such distributed neural networks may be scalable to exchange data with additional devices/sensors and any can include other suitable neural network such as a convolutional neural network (CNN), a deep neural network (DNN), and/or a recurrent convolutional neural network (RCNN), without departing from the scope of the present disclosure. As shown in FIG. 4, distributed neural network 400 includes an input layer on an input end, a sequence of interleaved convolutional layers and subsampling layers, and a fully-connected layer at an output end. When a merchandise item is added into the self-checkout vehicle 102, circuitry of the input layer module of the network 400 may be triggered to obtain still image data, video frame data, or any available data of the merchandise item captured and transmitted by the cameras 204 and/or 302. In one aspect, normalized image data in the red-green-blue color space may serve as inputs to the network 400. The input data may comprise a variety of different parameters of each merchandise item including but not limited to the shape, size, colors, and text information printed on each merchandise item, and/or one or more weights or dimensions of the merchandise item, either retrieved from a database, visually determined, or otherwise sensed. The network 400 may be configured to extract merchandise item features based on the input data, perform object detection and tracking of each merchandise item, and correlate with various merchandise item specific information stored in at least one of the associated database/system/server 126*a-c* (e.g., a retailer's inventory database).

More specifically, in some embodiments, a convolutional layer may receive data from the input layer in order to generate feature maps. For example, an input to a convolutional layer may include a mxmxr image where m is the height and width of the image (measured in pixel) and r is the number of channels, e.g., an RGB image has r=3. The convolutional layer may have k filters (or kernels) of size nxnxq where n is smaller than the dimension of the image and q may either be the same as the number of channels r or smaller and may vary for each kernel. The size of each filter gives rise to locally connected structures which are each convolved with the image to produce k feature maps of size m-n+1. Each map is then subsampled by a subsampling layer typically with mean or max-pooling over pxp contiguous regions where p may range between 2 for small images and usually not more than 5 for larger inputs. For example, max-pooling may provide for non-linear down-sampling of feature maps to generate subsampled feature maps. In an aspect, a subsampling layer may apply max-pooling by portioning feature maps into a set of non-overlapping portions and providing a maximum value for each portion of the set of non-overlapping portions. Either before or after a subsequent subsampling layer, an additive bias and sigmoidal nonlinearity may be applied to each feature map. For example, units of the same color may have been assigned the same weights. In some embodiments, any number of convolutional layers and subsampling layers may be added into the network 400 for generating and providing subsampled features maps to the fully connected layer (although it is also possible that the output(s) of one or more convolutional layers be provided as input to layers other than fully connected layers). In the case of convolutional outputs fed into fully connected networks or layers, the fully connected layer may use, e.g., a softmax activation function to use the features maps output from preceding convolutional layer or subsampling layer to classify the original input image into various classes based on training dataset stored on one of the associated database/system/server 126*a-c*. For example, possible outputs from the fully connected layer may indicate at least one of: a value representing the volume of a product; a value about at least one outer dimension of a product; a value representative of the geometrical shape of a product; a value representative of geometrical relations of a product, such as a relation between at least two of width, height and length; a set of at least two values related to colors of a product; a set of values related to the area which at least one specific color takes up in a product including the percentage that areas with a certain color take up with respect to at least one side of the outer surface of the product; data related to the color taking up the biggest fraction, optionally the second biggest fraction, etc. of at least one side of the outer surface of the product. Thereafter, the neural network 400 may perform object detection based at least on the outputs from the fully connected layer and the merchandise-specific information stored in at least one of the associated database/system/server 126*a-c* (e.g., a retailer's inventory database) to determine whether the shopper has placed the correct item after scanning the merchandise item with the barcode scanner 202.

Alternatively, according to another aspect of the present application, referring back to FIG. 1, the image recognition sensor 108 of the self-checkout vehicle 102 may be configured to: collect one or more images of a merchandise item after the merchandise item has been placed inside the self-checkout vehicle 102 or upon detecting that the merchandise item is being placed into the self-checkout vehicle 102, and transmit the images to the centralized computing device 124 via the communication network 120. That is, without requiring the shopper to scan each merchandise item, other sensors and components 114 of the self-checkout vehicle 102 may comprise one or more motion sensors configured to monitor and track movements relating to merchandise item placement into or removal from the self-checkout vehicle 102 (e.g., via triangulation, a movement detection and tracking algorithm powered by an RNN and/or a 3D convolutional neural network), and capture and transmit merchandise item images to the centralized computing device 124 for object detection and recognition. For example, the centralized computing device 124 may implement the neural network 400 of FIG. 4 to extract various features of each merchandise item image via a plurality of interleaved convolutional layers and sub-sampling layers and identify each merchandise item based on the extracted features, via, e.g., the fully connected layer. In one aspect, at least a portion of the neural network 400 may be configured to form a scalable end-to-end distributed neural network framework that may be used in various different contexts such as shopper facial recognition and/or voice recognition, or other cloud-based deep learning systems for retailer inventory management or shopping behavior analysis.

It should be appreciated that, in addition to the deep learning based object detection and recognition techniques described above, the self-checkout anti-theft system 100 of FIG. 1 may contemplate, for example, rigid or deformable template matching based methods, knowledge based methods, object based image analysis methods, or any other suitable methods. In one aspect, template matching based methods generally include generating and storing a template for each to-be-detected object class (e.g., each merchandise item in a store) by hand-crafting or learning from specific training set, and comparing an object image and the stored templates at a number of defined positions to measure similarity and locate the best matches via allowable translation, rotation, and scale changes. The most popular similarity measures may include the sum of absolute differences (SAD), the sum of squared differences (SSD), the normalized cross correlation (NCC), and the Euclidean distance (ED).

Further, knowledge-based object detection methods may focus on encoding specific shape or geometric information of a merchandise item and spatial constraints or relationships between the merchandise item and its background (specific location inside a store) to establish prior knowledge and detection rules for various hypotheses. Subsequently, an input image may be compared against the hypotheses via at least a set of selected search parameters within the neural network 400 thereby significantly reducing object recognition time. For example, instead of searching all of the available merchandise item images associated with a store upon receiving at least one input image of a merchandise item from the image recognition sensor 108 of the self-checkout vehicle 102, the centralized computing device 124 may also simultaneously receive the location data of the self-checkout vehicle 102 within the store (e.g., a specific side of an aisle of the store, or the counter location of a deli department of the store). Such location data may be determined by the other sensors and components 114 of the self-checkout vehicle 102 via a global positioning system (GPS) transceiver or any suitable locator apparatus. That is, the self-checkout vehicle 102 may be equipped with a GPS or similar device to pinpoint the exact location of the self-checkout vehicle 102 within the store, or calculate a triangulated position based on how quickly the other sensors and components 114 respond to different signals broadcast by different base stations deployed within the store. Based at least upon the received location data of the self-checkout vehicle 102 and store merchandise layout information, the centralized computing device 124 may be configured to search a portion of all available merchandise item images stored in the neural network 400, focusing on merchandise items satisfying a limited set of parameters. Thereafter, to further narrow down the search results and resolve ambiguity, the centralized computing device 124 may be configured to rely on other available merchandise item information (e.g., the weight of the merchandise item as measured by weight sensor 110) to perform one or more searches within results returned by a pervious search effort to finally identify the specific merchandise item placed in the self-checkout vehicle 102.

To improve search speed and accuracy, in one aspect, the centralized computing device 124 may be configured to simultaneously perform multiple above-noted object recognition operations with different search parameters within different datasets of the neural network 400. For example, for misplaced store items that have been chosen and placed in the self-checkout vehicle 102 by a customer, a search based on the detected location and weight of the merchandise item may be supplemented by one or more sequential or concurrent searches based on different search parameters (e.g., a combination of detected unique merchandise ID code and weight of the merchandise item). Such additional searches may be triggered in response to detecting a selected threshold value for an on-going search has been exceeded. For example, in response to detecting that 60% of an initial search of an input merchandise item image against a portion of merchandise item images saved in the neural network 400 based on location and weight information of the merchandise item yields less than 5 hits, the centralized computing device 124 may be configured to initiate at least one additional search based on a different combination of search parameters (e.g., a specific customer's shopping history and the unique merchandise ID code of the merchandise item). For another example, concurrent or sequential additional searches may be performed within labeled image data of merchandise items that are included in in-store promotions and collected from multiple shoppers during a selected period of time (e.g., past three days).

Moreover, an object-based image analysis method may first segment an image into a number of homogenous regions representing a relatively homogeneous group of pixels by selecting desired shape, scale, and compactness criteria. For example, the shape parameter may define to which percentage the homogeneity of shape is weighted against the homogeneity of spectral values. The compactness parameter may include a sub-parameter of shape and is used to optimize image objects with regard to compactness or smoothness. The scale parameter may be used for controlling the internal heterogeneity of the resulting objects and is therefore correlated with their average size, i.e., a larger value of the scale allows a higher internal heterogeneity, which increases the number of pixels per object and vice versa. Once segments are generated, one may extract object features, such as spectral information as well as size, shape, texture, geometry, and contextual semantic features. These features are then selected and fed to a classifier (e.g., membership function classifier, nearest neighbor classifier, decision tree, neural network of FIG. 4) for classification.

It should be appreciated that the image recognition neural network 400 may have two form-factors: computing performed directly on the self-checkout vehicle 102 via a graphics process unit (GPU) together with a central processing unit (collectively represented by the processor 104 in FIG. 1); and computing performed in a local server (e.g., the centralized computing device 124 of FIG. 1) which may be configured to exchange information with the processor unit 104 of the self-checkout vehicle 102 via the first communication network 120.

Figure 7:
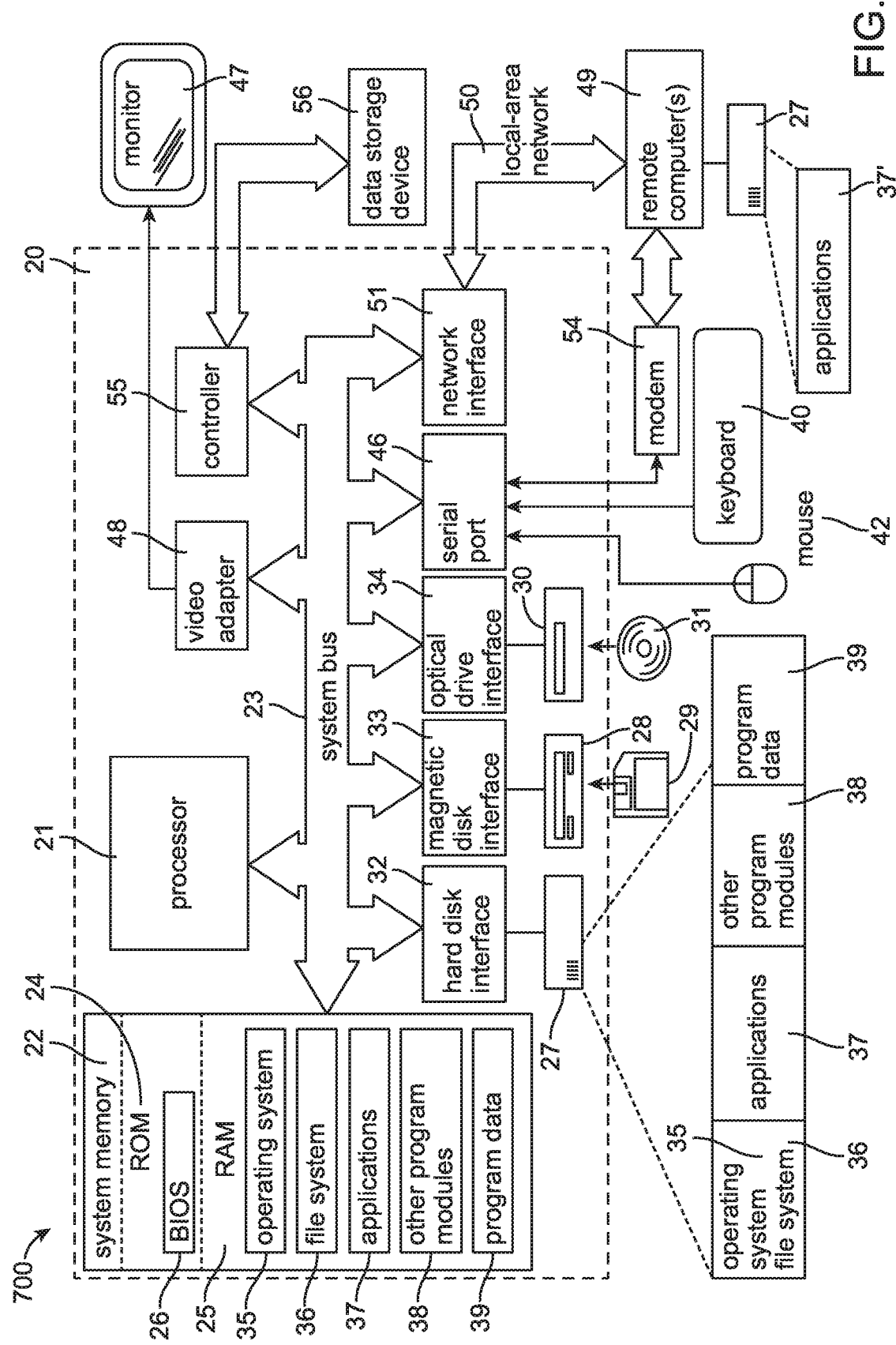
FIG. 7 depicts an example computer system in which one or more aspects of the present disclosure may be provided.

FIG. 7 illustrates an example computer environment 700 in which one or more aspects of the present disclosure may be provided. Included is a computing system 20 (which may be a computer or a server) on which the disclosed systems and methods can be implemented. It should be appreciated that the detailed computer environment 700 can correspond to the self-checkout vehicle 102 or the centralized computing device 124 provided to implement the systems, methods, and/or algorithms described herein.

As shown, the computing system 20 includes at least one processing unit 21 (e.g., a GPU, or a CPU, or a combination of both), a system memory 22 and a system bus 23 connecting the various system components, including the memory associated with the central processing unit 21. The central processing unit 21 can correspond to the processor 104 or the processor of the centralized computing device 124 (not shown, see FIG. 1) and the system memory 22 can correspond to memory 116 of FIG. 1, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the computing system 20, such as those at the time of loading the operating system with the use of the ROM 24.

The computing system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computing system 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computing system 20 has a file system 36, where the recorded operating system 35 is kept, and also additional program applications 37, other program modules 38 and program data 39. The user is able to enter commands and information into the computing system 20 by using input devices (keyboard 40, mouse 42). Other input devices (not shown) can be used: microphone, scanner, and so on. Such input devices usually plug into the computing system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computing system 20 is able to operate within a network environment, using a network connection to one or more remote computers 49. The remote computer (or computers) 49 are also computers or servers having the majority or all of the aforementioned elements in describing the nature of a computing system 20. Other devices can also be present in the computer network, such as routers, network stations, peer devices or other network nodes. According to one aspect, the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the computing system 20 is connected to the local-area network 50 across a network adapter or network interface 51. When networks are used, the computing system 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of generating training data for a real-time merchandise identification neural network, the method comprising:
    obtaining, for each given merchandise item of a plurality of merchandise items, a series of captured images depicting the given merchandise item from multiple angles and in front of multiple different backgrounds, wherein the series of captured images comprises images captured from a plurality of cameras, each camera having a point-of-view associated with one of the multiple angles, the different backgrounds comprise assortments of other ones of the plurality of merchandise items;
    generating a labeled training datasets for the plurality of merchandise items for each of the plurality of cameras, wherein generating a labeled training dataset for a camera comprises, for a subset of the series of captured images depicting a given merchandise item at one of the multiple angles:
        normalizing the subset of captured images to thereby generate a set of normalized merchandise images, wherein the given merchandise item occupies at least a threshold percentage of pixels in each normalized image;

extending the training dataset with a plurality of augmented merchandise images, wherein the augmented merchandise images are generated by applying one or more augmentation operations to each normalized merchandise image;

populating the training dataset with a plurality of training data points for the given merchandise item, wherein each one of the normalized merchandise images and augmented merchandise images is represented by at least one training data point; and labeling the training dataset by generating one or more labels for each training data point, the one or more labels mapping the training data point to attributes associated with the given merchandise item depicted in the training data point; and training an input neural network for each camera of the plurality of cameras based on the labeled training dataset generated for the camera, wherein each input neural network is trained such that a resulting trained neural network can perform real-time identification of selected merchandise items of the plurality of merchandise items placed into a self-checkout apparatus by a user.

2. The method of claim 1, wherein:
the plurality of merchandise items belongs to an inventory of merchandise items each uniquely associated with a merchandise ID;
the attributes mapped by the one or more labels include the merchandise ID uniquely associated with the given merchandise item; and
the real-time identification of selected merchandise items comprises:
capturing identification images of the selected merchandise items as they are placed into the self-checkout apparatus by the user; and
providing the identification images of the selected merchandise items to the plurality of trained input neural networks, wherein an output of each trained input neural network is used to generate one or more final identification results for identifying the selected merchandise item.

3. The method of claim 2, wherein:
the trained input neural network is an object classification neural network; and
the labeled training dataset is a labeled object classification training dataset containing training data points for each merchandise item belonging to the inventory of merchandise items.

4. The method of claim 3, further comprising performing inventory registration by:
training the one or more input neural networks on the labeled object classification training dataset such that each merchandise item of the inventory is represented as a unique classification within the trained object classification neural network; and
associating the unique classifications for each merchandise item of the inventory with a corresponding merchandise ID for each merchandise item.

5. The method of claim 4, wherein:
the trained object classification neural network outputs one or more probable classifications for the input identification images of the selected merchandise item;
the one or more probable classifications are filtered based at least in part on collection information associated with the capture of the identification images of the selected merchandise item; and
the final identification results are generated at least in part by mapping a remaining probable classifications to their corresponding merchandise ID.

6. The method of claim 4, further comprising performing inventory updating by:
generating new labeled training data for each new merchandise item added to the inventory;
updating the labeled training dataset to include the new labeled training data for each new merchandise item; and
training the one or more input neural networks on the updated labeled training dataset to generate an updated trained object classification neural network.

7. The method of claim 2, wherein:
the trained input neural network is a feature extraction neural network; and
the labeled training dataset is a labeled feature extraction training dataset containing training data points for only a sub-set of the merchandise items belonging to the inventory of merchandise items.

8. The method of claim 7, further comprising performing inventory registration by:
training the one or more input neural networks on the labeled feature extraction training dataset, such that the trained feature extraction neural network generates a unique embedding that corresponds to the features of an input object;
using the trained feature extraction neural network, generating a unique embedding for each merchandise item of the inventory, independent of whether or not a merchandise item was contained in the labeled feature extraction dataset;
for each merchandise item of the inventory, associating the unique embedding for the merchandise item with a corresponding merchandise ID of the merchandise item; and
storing (unique embedding, merchandise ID) pairs in an inventory registration database.

9. The method of claim 8, wherein:
the trained feature extraction neural network outputs one or more embeddings for the input identification images of the selected merchandise item;
the final identification results are generated by analyzing the output embeddings against at least a portion of the (unique embedding, merchandise ID) pairs stored in the inventory registration database;
wherein the portion of (unique embedding, merchandise ID) pairs is determined by filtering the inventory registration database based at least in part on collection information associated with the capture of the identification images of the selected merchandise item.

10. The method of claim 8, further comprising performing inventory updating by:
obtaining a new set of captured images of each new merchandise item added to the inventory;
generating, using the new set of captured images as input to the trained feature extraction neural network, a unique embedding for each new merchandise item; and
storing, in the inventory registration database, a new (unique embedding, merchandise ID) pair for each of the new merchandise items added to the inventory.

11. The method of claim 1, wherein at least a portion of the labeled training dataset is automatically generated for a user-selected merchandise item, the generating triggered in response to one or more of:

a determination that the user-selected merchandise item has been placed in a self-checkout apparatus; or an indication that a barcode, Universal Product Code (UPC), or merchandise ID for the user-selected merchandise item has been determined at the self-checkout apparatus.

12. The method of claim 2, wherein the merchandise ID includes one or more of a barcode, a Universal Product code (UPC), or a Price Look Up (PLU) code.

13. The method of claim 1, further comprising:

evaluating a performance of the trained neural network in real-time identification of the selected merchandise items placed into the self-checkout apparatus by the user; and in response to determining that the trained neural network fails to achieve a minimum threshold performance in identifying certain merchandise items, obtaining a plurality of supplemental captured images depicting the certain merchandise items.

14. The method of claim 13, further comprising:

generating, based at least in part on the supplemental captured images, supplemental labeled training data of the certain merchandise items for which the trained neural network failed to achieve the minimum threshold performance in identifying;

updating the labeled training dataset with the supplemental labeled training data; and re-training the one or more input neural networks on the updated labeled training dataset.

15. The method of claim 1, wherein normalizing the series of captured images comprises cropping each captured image such that the given merchandise item occupies a substantially constant proportion of a frame of each normalized merchandise image.

16. The method of claim 15, further comprising cropping to a predicted bounding box representing a probable location of the given merchandise item in the frame of the captured image, wherein the predicted bounding box is generated by a computer vision object tracking system that tracks the given merchandise item as it is maneuvered into place for obtaining the series of captured images.

17. The method of claim 1, wherein the augmentation operations include:

modifying one or more properties of the captured image, the properties including:

brightness, contrast, a hue for each RGB channel, rotation, blur, sharpness, saturation, size, and padding; or performing one or more operations on the captured image, the operations including:

histogram equalization, embossing, flipping, adding random noise, adding random dropout, edge detection, piecewise affine, pooling, and channel shuffle.

18. The method of claim 17, wherein one or more augmentation operations are applied to each normalized merchandise image, wherein a level or magnitude of the augmentation operation is determined randomly.

19. The method of claim 1, wherein the attributes mapped by the one or more labels generated for the training data associated with each given merchandise item include:

an identifier of an angle, POV, or camera from which the training data was derived; or one or more of: a merchandise item weight, color, primary color, color percentages, geometrical relationships, dimensions, dimension ratios, shape, or volume.

20. A non-transitory computer-readable storage medium storing instructions that, when executed by a processor, cause the processor to:

obtain, for each given merchandise item of a plurality of merchandise items, a series of captured images depicting the given merchandise item from multiple angles and in front of multiple different backgrounds, wherein the series of captured images comprises images captured from a plurality of cameras, each camera having a point-of-view associated with one of the multiple angles, the different backgrounds comprise assortments of other ones of the plurality of merchandise items;

generate a labeled training datasets for the plurality of merchandise items for each of the plurality of cameras, wherein generating a labeled training dataset for a camera comprise, for a subset of the series of captured images depicting a given merchandise item at one of the multiple angles:

normalizing the subset of captured images to thereby generate a set of normalized merchandise images, wherein the given merchandise item occupies at least a threshold percentage of pixels in each normalized image;

extending the training dataset with a plurality of augmented merchandise images, wherein the augmented merchandise images are generated by applying one or more augmentation operations to each normalized merchandise image;

populating the training dataset with a plurality of training data points for the given merchandise item, wherein each one of the normalized merchandise images and augmented merchandise images is represented by at least one training data point; and labeling the training dataset by generating one or more labels for each training data point, the one or more labels mapping the training data point to attributes associated with the given merchandise item depicted in the training data point; and train an input neural network for each camera of the plurality of cameras based on the labeled training dataset generated for the camera, wherein each input neural network is trained such that a resulting trained neural network can perform real-time identification of selected merchandise items of the plurality of merchandise items placed into a self-checkout apparatus by a user.

* * * * *